(12) United States Patent
Wu et al.

(10) Patent No.: US 10,473,684 B2
(45) Date of Patent: Nov. 12, 2019

(54) METHOD AND APPARATUS FOR PROVIDING MOVEMENT DETECTION BASED ON AIR PRESSURE DATA

(71) Applicant: Nokia Technologies Oy, Espoo (FI)

(72) Inventors: Tao Wu, Andover, MA (US); Jialing Li, Cambridge, MA (US)

(73) Assignee: Nokia Technologies Oy, Espoo (FI)

( * ) Notice: Subject to any disclaimer, the term of this patent is extended or adjusted under 35 U.S.C. 154(b) by 591 days.

(21) Appl. No.: 14/517,489

(22) Filed: Oct. 17, 2014

(65) Prior Publication Data
US 2016/0106368 A1 Apr. 21, 2016

(51) Int. Cl.
*G01P 13/00* (2006.01)
*G01P 3/62* (2006.01)

(52) U.S. Cl.
CPC .............. *G01P 13/00* (2013.01); *G01P 3/62* (2013.01)

(58) Field of Classification Search
CPC .................................. G01P 13/00; G01P 3/62
USPC .......................................................... 702/50
See application file for complete search history.

(56) References Cited

U.S. PATENT DOCUMENTS

| | | | |
|---|---|---|---|
| 8,571,795 B2 | 10/2013 | Takaoka et al. | |
| 2010/0026503 A1 | 2/2010 | Proefke et al. | |
| 2012/0083705 A1* | 4/2012 | Yuen ................... | A61B 5/0002 600/508 |
| 2012/0264446 A1 | 10/2012 | Xie et al. | |
| 2014/0039840 A1* | 2/2014 | Yuen .................... | A61B 5/6838 702/189 |
| 2014/0256306 A1* | 9/2014 | MacGougan ........... | H04W 4/02 455/418 |

FOREIGN PATENT DOCUMENTS

DE 102011076245 A1 7/2012

OTHER PUBLICATIONS

A. Covert, "Why the Barometer Is Android's New Trump Card", retrieved on Jan. 21, 2015 from internet website http://gizmodo.com/5851288/why-the-barometer-is-androids-new-trump-card, 3 pages.

* cited by examiner

*Primary Examiner* — Mohamed Charioui
*Assistant Examiner* — Christine Y Liao
(74) *Attorney, Agent, or Firm* — Ditthavong & Steiner, P.C.

(57) ABSTRACT

An approach is provided for determining movement information for at least one user device based, at least in part, on air pressure sensor data. The approach involves determining reference air pressure data associated with a reference set of devices. The approach also involves processing and/or facilitating a processing of the reference air pressure data to cause, at least in part, a classification of the reference air pressure data into one or more candidate movement status categories. The approach further involves determining air pressure sensor data associated with at least one user device. The approach also involves determining at least one movement status category for the at least one user device from among the one or more candidate movement status categories based, at least in part, on the classification.

20 Claims, 21 Drawing Sheets

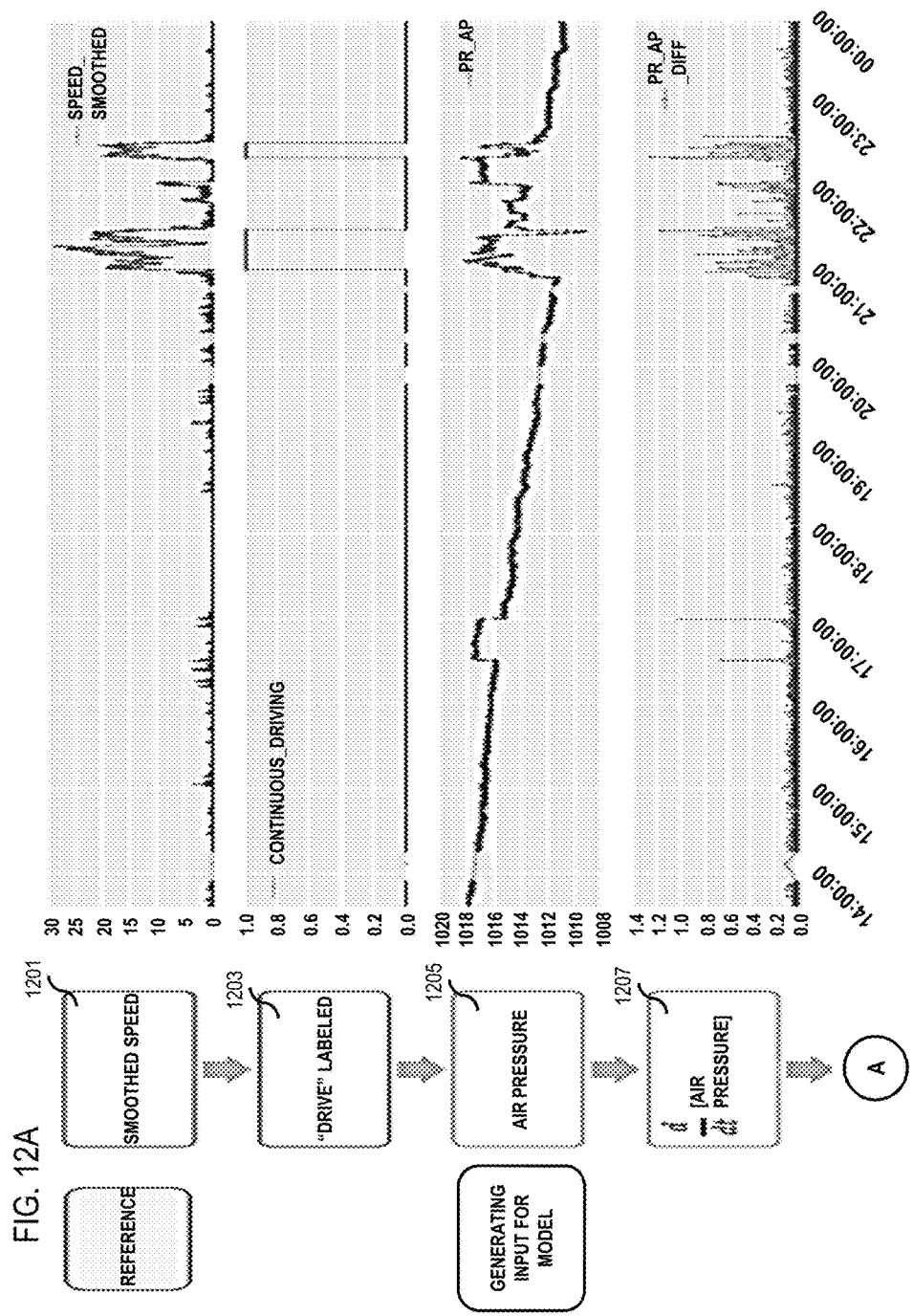

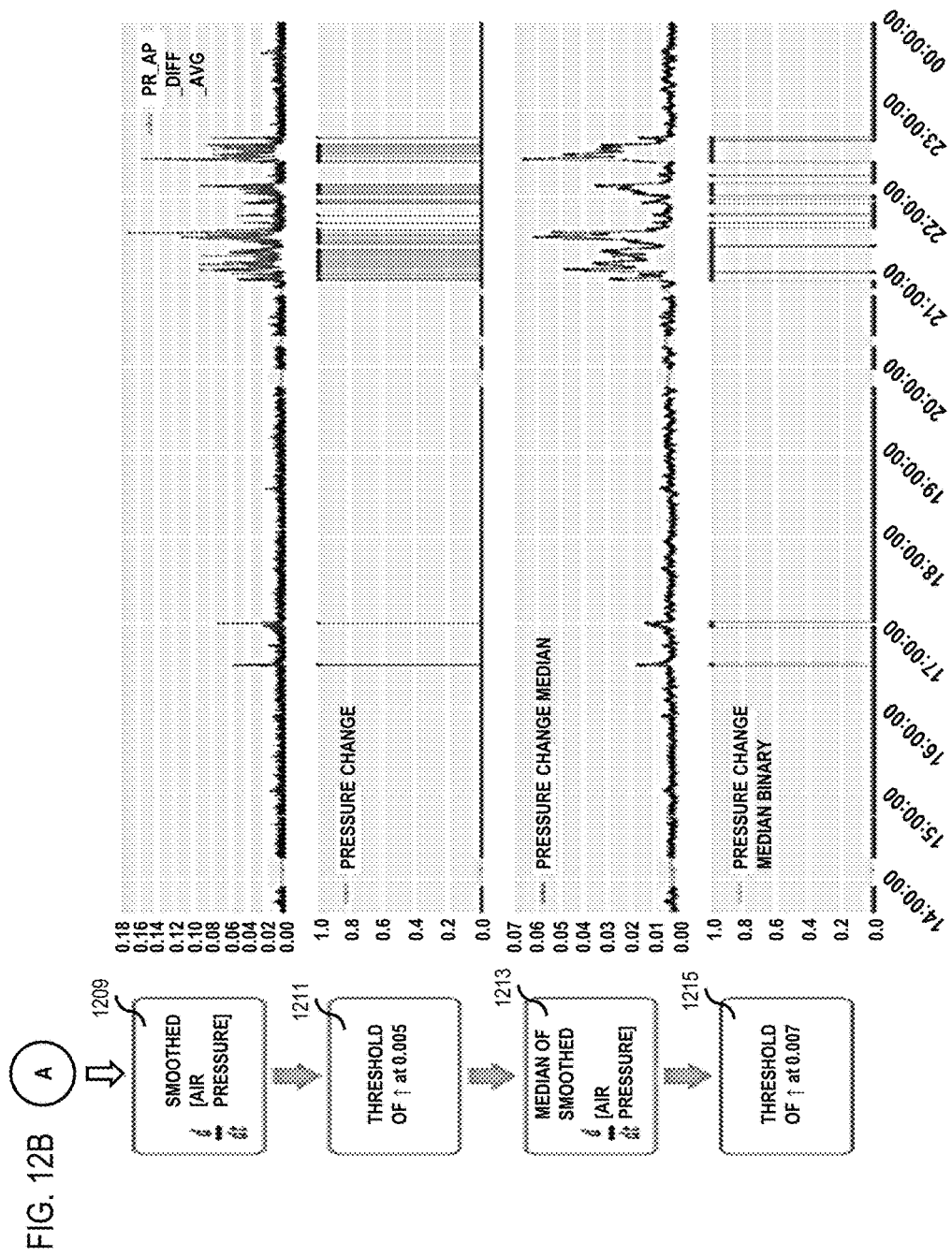

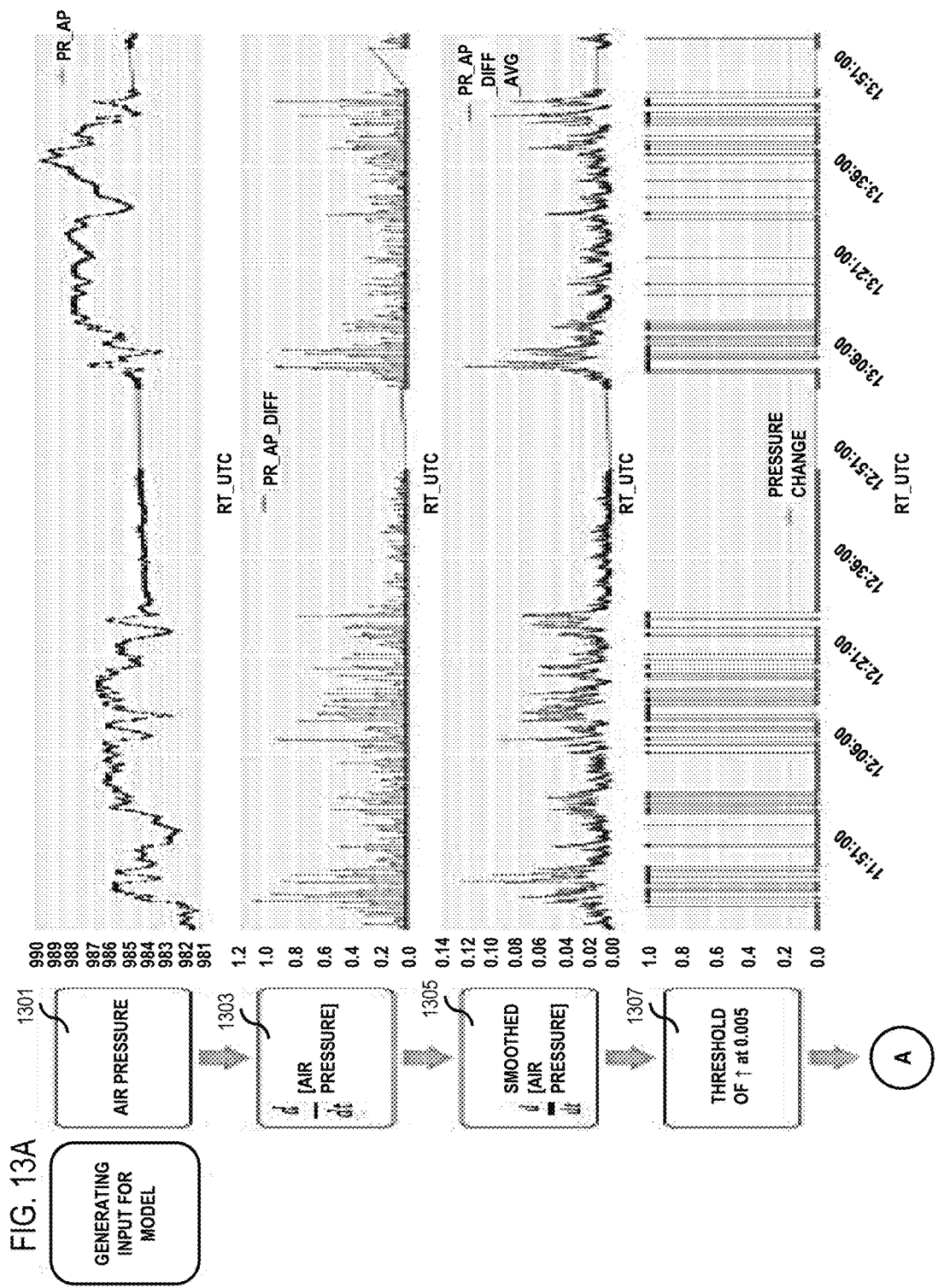

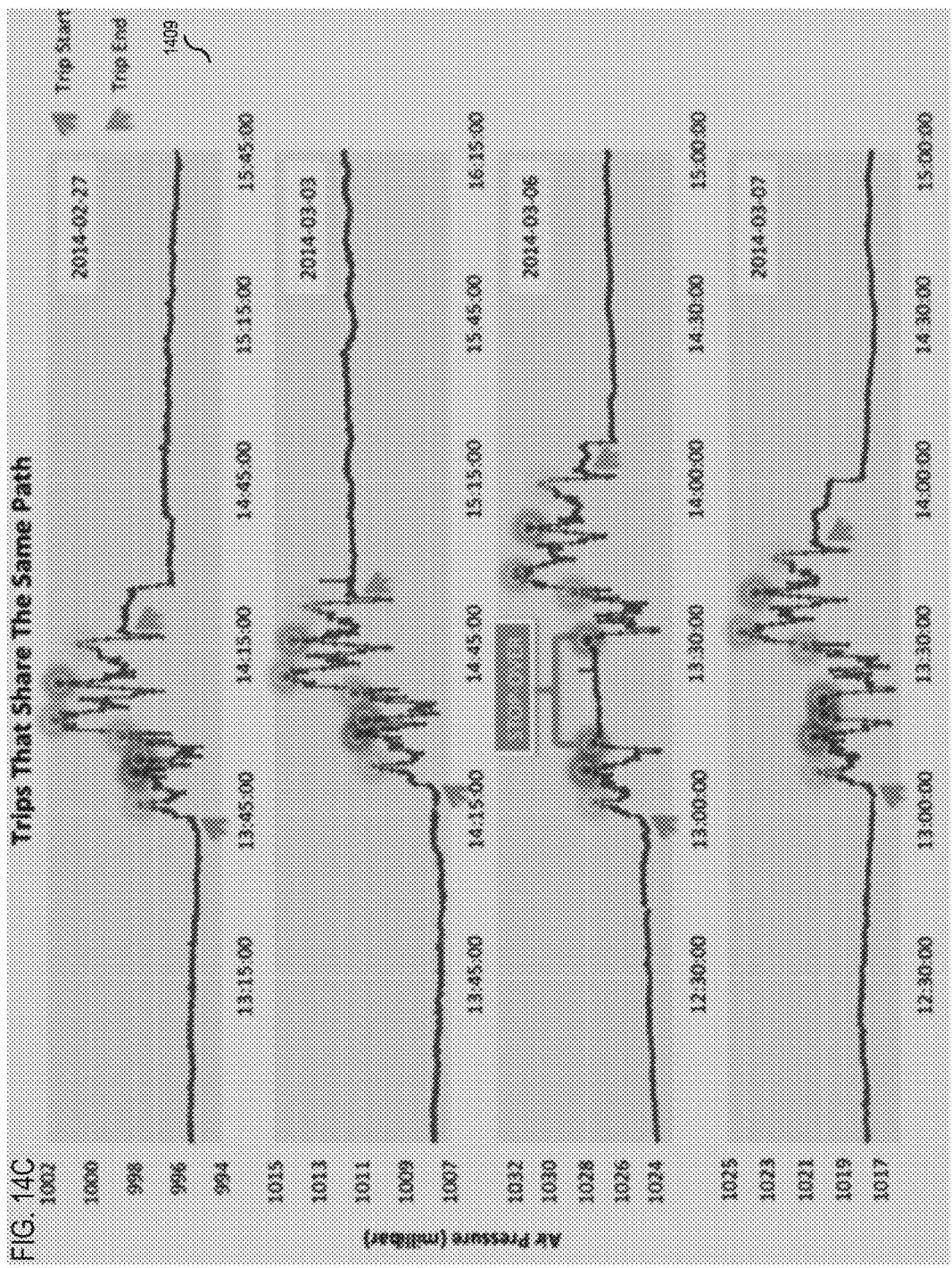

METHOD AND APPARATUS FOR PROVIDING MOVEMENT DETECTION BASED ON AIR PRESSURE DATA

BACKGROUND

With the advancement in technology, mobile devices are capable of collecting real-time motion status for one or more users. However, privacy concerns and battery consumption restricts the willingness of one or more users to access mobile device applications (e.g. GPS) and share information on their motion status. Since, knowledge about a user's motion status is important, service providers and device manufacturers (e.g., wireless, cellular, etc.) are continually challenged to deliver value and convenience to consumers by, for example, providing a method that detects motion status of one or more users in a private, power efficient, and GPS independent manner.

Some Example Embodiments

Therefore, there is a need for an approach for determining movement information for at least one user device based, at least in part, on air pressure sensor data.

According to one embodiment, a method comprises determining reference air pressure data associated with a reference set of devices. The method also comprises processing and/or facilitating a processing of the reference air pressure data to cause, at least in part, a classification of the reference air pressure data into one or more candidate movement status categories. The method further comprises determining air pressure sensor data associated with at least one user device. The method also comprises determining at least one movement status category for the at least one user device from among the one or more candidate movement status categories based, at least in part, on the classification.

According to another embodiment, an apparatus comprises at least one processor, and at least one memory including computer program code for one or more computer programs, the at least one memory and the computer program code configured to, with the at least one processor, cause, at least in part, the apparatus to determine reference air pressure data associated with a reference set of devices. The apparatus is also caused to process and/or facilitate a processing of the reference air pressure data to cause, at least in part, a classification of the reference air pressure data into one or more candidate movement status categories. The apparatus is further caused to determine air pressure sensor data associated with at least one user device. The apparatus is also caused to determine at least one movement status category for the at least one user device from among the one or more candidate movement status categories based, at least in part, on the classification.

According to another embodiment, a computer-readable storage medium carries one or more sequences of one or more instructions which, when executed by one or more processors, cause, at least in part, an apparatus to determine reference air pressure data associated with a reference set of devices. The apparatus is also caused to process and/or facilitate a processing of the reference air pressure data to cause, at least in part, a classification of the reference air pressure data into one or more candidate movement status categories. The apparatus is further caused to determine air pressure sensor data associated with at least one user device. The apparatus is also caused to determine at least one movement status category for the at least one user device from among the one or more candidate movement status categories based, at least in part, on the classification.

According to another embodiment, an apparatus comprises means for determining reference air pressure data associated with a reference set of devices. The apparatus also comprises means for processing and/or facilitating a processing of the reference air pressure data to cause, at least in part, a classification of the reference air pressure data into one or more candidate movement status categories. The apparatus further comprises means for determining air pressure sensor data associated with at least one user device. The apparatus also comprises means for determining at least one movement status category for the at least one user device from among the one or more candidate movement status categories based, at least in part, on the classification.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 12A and 12B illustrate a graphical representation of the functioning of an algorithm for determining the rate of change in air pressure data for at least one user device, according to one example embodiment;

FIGS. 13A and 13B are graphical representations of the functioning of an algorithm for further processing of the rate of change in pressure data to be inputted into the driving-versus-not-driving classifier and for measuring the accuracy of such a classifier, according to one example embodiment;

FIG. 14C is a graph related to path recognition, according to one example embodiment;

DESCRIPTION OF SOME EMBODIMENTS

Examples of a method, apparatus, and computer program for determining movement information for at least one user device based, at least in part, on air pressure sensor data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
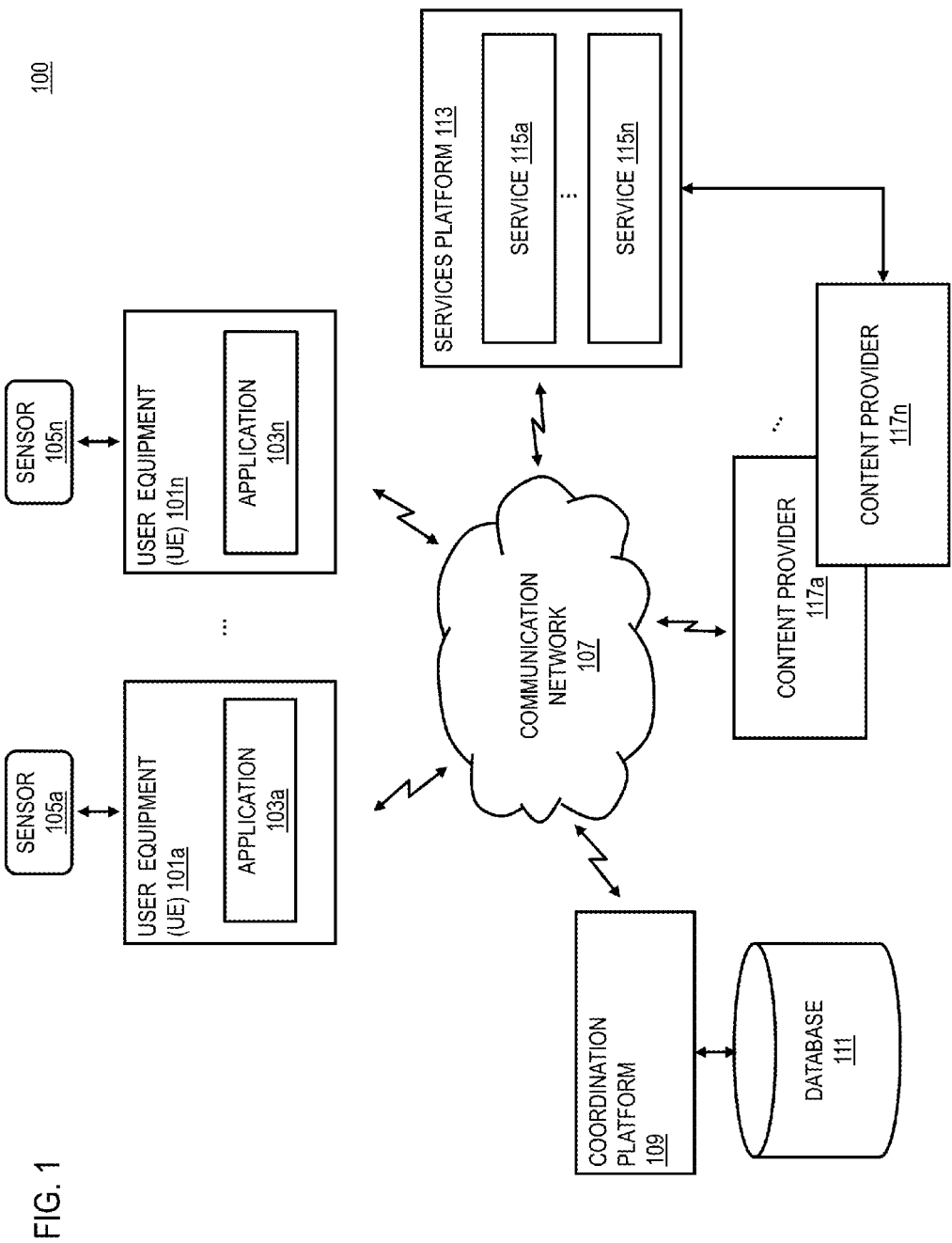
FIG. 1 is a diagram of a system capable of determining movement information for at least one user device based, at least in part, on air pressure sensor data, according to one embodiment.

FIG. 1 is a diagram of a system capable of determining movement information for at least one user device based, at least in part, on air pressure sensor data, according to one embodiment. In one scenario, knowledge about a user's motion status is important for tailoring user experience in various mobile device applications. However, due to privacy implications associated with the mobile device applications users are less likely to consent to the functioning of a tracking application in their mobile device, for example, global positioning sensors (GPS) tracking. In addition, the GPS tracking consumes comparatively large amount of power and is only accurate during unobstructed network coverage. As a result, GPS is not likely to be available on a continuous basis due to privacy concerns and battery level. On the other hand, in an accelerometer based approach, the inertia-based sensing suffers from integration drifts, and thus has an error that grows with time and might need constant re-zeroing. To resolve these issues, system 100 detects in-vehicle status from a barometer reading in a power-efficient and GPS-independent way, with a higher level of accuracy. The barometer reading is highly sensitive to outdoor elevation changes, therefore it knows when a user is on-the-go. For example, barometer may build foundation for sensing life events such as commuting between home and work, sending and picking up kids from school, weekend shopping, dining out, etc. In one scenario, the system 100 may generate a mathematical model from the barometer reading on a mobile device to determine the presence of at least one user in at least one vehicle, modes of transportation, variations in user activities, variations in vehicular movement, or a combination thereof.

In one embodiment, the system 100 may implement a population-based model that is less subject to influences from individual habits. Such population-based model applies universally to new users adopting the mobile devices. The system 100 collects one or more reference air pressure data, and classifies the one or more reference air pressure data into candidate movement status category. The system 100 consults the candidate movement status categories to determine the movement status category for at least one user device.

In one embodiment, the system 100 may collect historical travel information for at least one user. Then, the system 100 may determine the duration for one or more future trips based, at least in part, on the historical travel information. In one scenario, the system 100 may consider a user's ephemeral history, so when a user comes to a brief stop, for example, traffic stop during a trip, the in-vehicle context does not change. In another embodiment, the system 100 may cross-reference one or more detected results with models based on radio sensors, and tune model parameters for an individual over time. In one example embodiment, there are mobile device applications that assist a user in recording parking location and retrieve it later, however, this requires the user to remember to record the parking location. The system 100 may detect when the in-vehicle status ceased and automatically record the parking location without user input.

In one embodiment, the system 100 may determine the position for at least one user in a known path by using barometer sensors. The system 100 may process barometer sensor data to determine a location for a device associated with at least one user on a known path. In one scenario, air pressure at a specific location is known to be affected by various factors, including but not limited to, weather conditions and elevation. In one example embodiment, a user travelling in a motor vehicle may experience air pressure changes, since the weather condition do not change over a short period of time, the air pressure changes the user observes during the travel period is by and large determined by the elevation change on the path. As such, elevation change is a critical factor in determining the air pressure change. In one scenario, the system 100 may know the travel path for at least one user (a user driving from work to home is often predictable/known). The system 100 may process the air pressure data to determine the position of the user on the known travel path.

In one embodiment, the system 100 may determine a route the at least one user is on. More specifically, the system 100 may determine a user's route among multiple possible routes. The system 100 may use barometer sensor data to determine the route at least one user is on. As discussed, weather condition during a travel do not change over a short period of time, hence the air pressure changes observed during the travel may be due to the change in elevation. The system 100 may process the change in the air pressure data to determine the route taken by at least one user.

The system 100 comprises of a UE 101a-101n (hereinafter UE 101). By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), smart watches, audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or Wi-Fi connection either through the inbuilt communication equipment or from the UE 101 associated with the vehicles. The applications 103 may assist in conveying sensor information via the communication network 107.

The system 100 comprises of applications 103a-103n (hereinafter applications 103). By way of example, the applications 103 may be any type of application that is executable at the UE 101, such as air-pressure based service applications, sensor monitoring applications, calendar applications, content provisioning services, navigation applications, GIS applications, and the like. In one embodiment, one of the applications 103 at the UE 101 may act as a client for the coordination platform 109 and may perform one or more functions associated with the functions of the coordination platform 109 by interacting with the coordination platform 109 over the communication network 107.

The system 100 comprises of sensors 105a-105n (hereinafter sensors 105). By way of example, the sensors 105 may be any type of sensor. In one embodiment, the sensors 105 may include, for example, a barometer for gathering air pressure data. In certain embodiments, sensors 105 may include an accelerometer, a network detection sensor for detecting wireless signals or receivers for different short-range communications (e.g., Bluetooth, Wi-Fi, Li-Fi, near field communication, etc.), temporal information sensor, temperature sensors, etc. The one or more sensors may work individually or together to collect the sensor data. In one scenario, accelerometer may detect movements of a user associated with a user device, for example, a user moving from sitting position to standing position while the barometer may record any changes in air pressure during the movement. In one scenario, sensors 105 may perform the function of activity monitor, step counter, place monitor and route tracker. The sensors 105 may be used to track user's movements and physical activities, and may run constantly in the background to collect and preserve data. Even though sensors 105 are constantly active they run in a low power mode consuming negligible amount of battery. Further, since the sensors 105 provide access to user's private data, user has the option of disabling the functioning of the sensors and clearing any collected data. In one scenario, activity monitor provides information about changes in user's physical activity, for example, when user starts or stops walking, remains stationary or drives a vehicle. In order to filter out the noise, changes are not reported more often than every ten seconds.

By way of example, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

The system 100 comprises of the coordination platform 109. In one embodiment, the coordination platform 109 may be a platform with multiple interconnected components. The coordination platform 109 may include multiple servers, intelligent networking devices, computing devices, components and corresponding software for determining movement information for at least one user device based, at least in part, on air pressure sensor data.

In one embodiment, the coordination platform 109 may determine reference air pressure data associated with a reference set of devices. In one scenario, air pressure data is an efficient way of determining moving status of one or more users in various moving vehicles in a power saving and GPS independent manner. The coordination platform 109 may collect and measure the air pressure data for one or more reference set of devices. Then, the coordination platform 109 may associate the air pressure data with one or more user context (e.g., moving, idle, in a vehicle etc.) via labelling.

In one embodiment, the coordination platform 109 may process and/or facilitate a processing of the reference air pressure data to cause, at least in part, a classification of the reference air pressure data into one or more candidate movement status categories. The coordination platform 109 may use barometer to collect various air pressure data with a user's labelled context for determining the motion status (moving or non-moving) of the user. In one scenario, the coordination platform 109 may classify the activities of one or more users into a hierarchy of activity classes:

Other (base class for all activities)
    Idle (device is laying still)
    Stationary (device is on hand but not moving)
    Moving:
        Moving on foot:
        Walking
        Running
        Moving in a vehicle.

In one scenario, the coordination platform 109 may specify a set of activity classes of interest to observe the changes in activity. When the activity change occurs the coordination platform 109 receives a notification that matches the specified activities as closely as possible. For example, if an application is interested in idle and moving activities, it receives moving notification regardless of whether the recognized activity is walking or running. All activity classes belong to other class.

In one embodiment, the coordination platform 109 may determine air pressure sensor data associated with at least one user device. Then, the coordination platform 109 may determine at least one movement status category for the at least one user device from among the one or more candidate movement status categories based, at least in part, on the classification.

In one embodiment, the coordination platform 109 may include or have access to geographic database 111 to access or store any kind of data, such as air pressure sensor data, traffic conditions, routing information, location information, temporal information, contextual information, etc. Data stored in the geographic database 111 may, for instance, be provided by the UE 101, the sensors 105, the services platform 113, one or more services 115a-115n (or services 115), or one or more content providers 117a-117n (or content providers 117).

The services platform 113 may include any type of service. By way of example, the services platform 113 may include air pressure data determination services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the coordination platform 109 and the content providers 117 to supplement or aid in the processing of the content information (e.g., air pressure data).

In one embodiment, the services 115 may be an online service that reflects interests and/or activities of users. In one scenario, the services 115 provide representations of each user (e.g., a profile), his/her social links, and a variety of additional information. The services 115 allow users to share location information, navigation related information, activities information, contextual information, historical user information and interests within their individual networks, and provides for data portability.

The content providers 117 may provide content to the UE 101, the coordination platform 109, and the services 115 of the services platform 113. The content provided may be any type of content, such as, air pressure data etc. In one embodiment, the content providers 117 may provide content that may supplement content of the applications 103, sensors 105, or a combination thereof. By way of example, the content providers 117 may provide content that may aid in determining movement information for at least one user device. In another embodiment, the content providers 117 may also store content associated with the UE 101, the coordination platform 109, and the services 115 of the services platform 113. In a further embodiment, the content providers 117 may manage access to a central repository of data, and offer a consistent, standard interface to data.

By way of example, the UE 101, the coordination platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
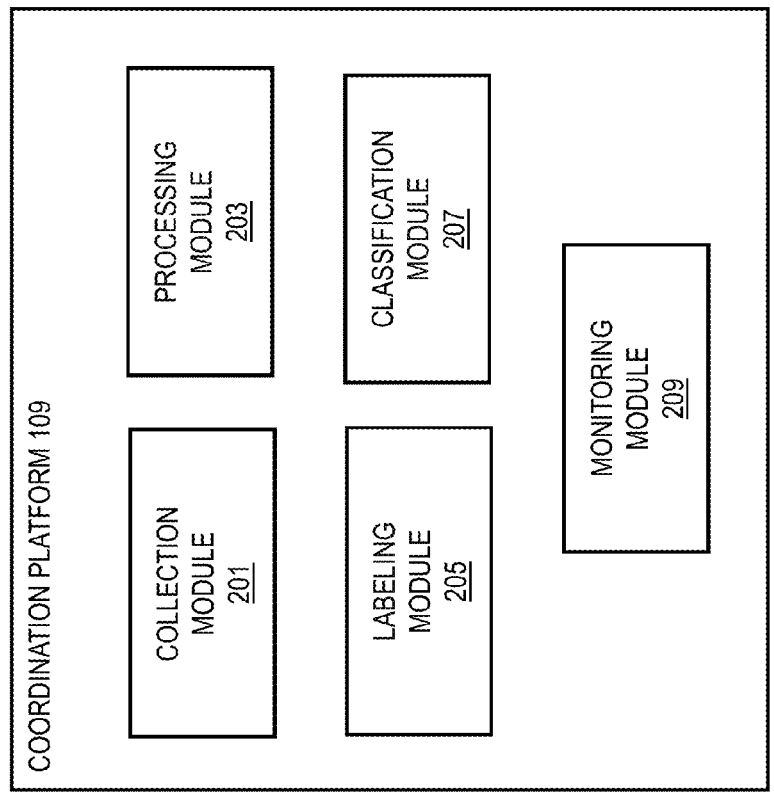
FIG. 2 is a diagram of the components of the coordination platform 109, according to one embodiment.

FIG. 2 is a diagram of the components of the coordination platform 109, according to one embodiment. By way of example, the coordination platform 109 includes one or more components for determining movement information for at least one user device based, at least in part, on air pressure sensor data. In this embodiment, the coordination platform 109 includes a collection module 201, a processing module 203, a labelling module 205, a classification module 207, and a monitoring module 209. It is contemplated that the functions of these components may be combined in one or more components or performed by other components of equivalent functionality.

In one embodiment, the collection module 201 may collect reference air pressure data associated with reference set of devices. In another embodiment, the collection module 201 may collect air pressure data associated with at least one vehicle, at least one user device, or a combination thereof. Then, the collection module 201 may provide the processing module 203 with the collected reference air pressure data, air pressure data, or a combination thereof. In a further embodiment, the collection module 201 may collect historical travel information for at least one user device. The collection module may determine duration for one or more future trips based, at least in part, on the historical travel information. In one scenario, a temporary travel stopover for at least one vehicle, at least one user device, or a combination thereof may be determined based, at least in part, on historical travel information.

In one embodiment, the processing module 203 may process reference air pressure data to cause, at least in part, a classification of the reference air pressure data into one or more candidate movement status categories. In another embodiment, the processing module 203 may process the air pressure data associated with at least one vehicle, at least one user device, or a combination thereof to determine the movement status category. In one scenario, the processing module may cause an assessment of the air pressure data associated with at least one vehicle, at least one user device, or a combination thereof to select movement status category from the candidate movement status category. In another scenario, the processing module 203 may cause a comparison between the reference air pressure data and the air pressure data to measure the accuracy of the one or more results from a classifier.

In one embodiment, the labelling module 205 may cause labeling of the reference air pressure data based, at least in part, on one or more contexts associated with the reference set of devices. The one or more labelling may be based on the user input, sensor data, or a combination thereof. In one scenario, the labelling module 205 may provide the collection module 201 with the labelled air pressure data, whereupon the labelled air pressure data may be stored in a cloud storage. In another scenario, the one or more labelled air pressure data may be extracted from the cloud storage to adjust one or more parameters based, at least in part, on air pressure data. Then, an optimized status for at least one vehicle, at least one user device, or a combination thereof may be generated.

In one embodiment, the classification module 207 may categorize one or more reference air pressure data. Such classification of one or more reference air pressure data supports in determining movement status category for at least one user device. In one scenario, the classification of one or more reference air pressure data may be based, at least in part, on contexts associated with one or more reference set of objects, one or more user devices or a combination thereof. In another scenario, the contexts may include user activity information, vehicular movement information, or a combination thereof. In a further scenario, the user activity information may include identifying whether a user is stationary, moving, riding a vehicle, or a combination thereof.

In one embodiment, the monitoring module 209 may monitor the air pressure data for reference set of devices, at least one vehicle, at least one user device, or a combination thereof. In another embodiment, the monitoring module 209 may perform real-time monitoring of one or more user activities, one or more vehicular movements, or a combination thereof. In one scenario, the monitoring module 209 may cause a notification of any changes in user activities, vehicular movements, or a combination thereof.

The above presented modules and components of the coordination platform 109 can be implemented in hardware, firmware, software, or a combination thereof. Though depicted as a separate entity in FIG. 1A, it is contemplated that the coordination platform 109 may be implemented for direct operation by respective UE 101. As such, the coordination platform 109 may generate direct signal inputs by way of the operating system of the UE 101 for interacting with the applications 103. In another embodiment, one or more of the modules 201-209 may be implemented for operation by respective UEs, the coordination platform 109, or combination thereof. Still further, the coordination platform 109 may be integrated for direct operation with services 115, such as in the form of a widget or applet, in accordance with an information and/or subscriber sharing arrangement. The various executions presented herein contemplate any and all arrangements and models.

Figure 3:
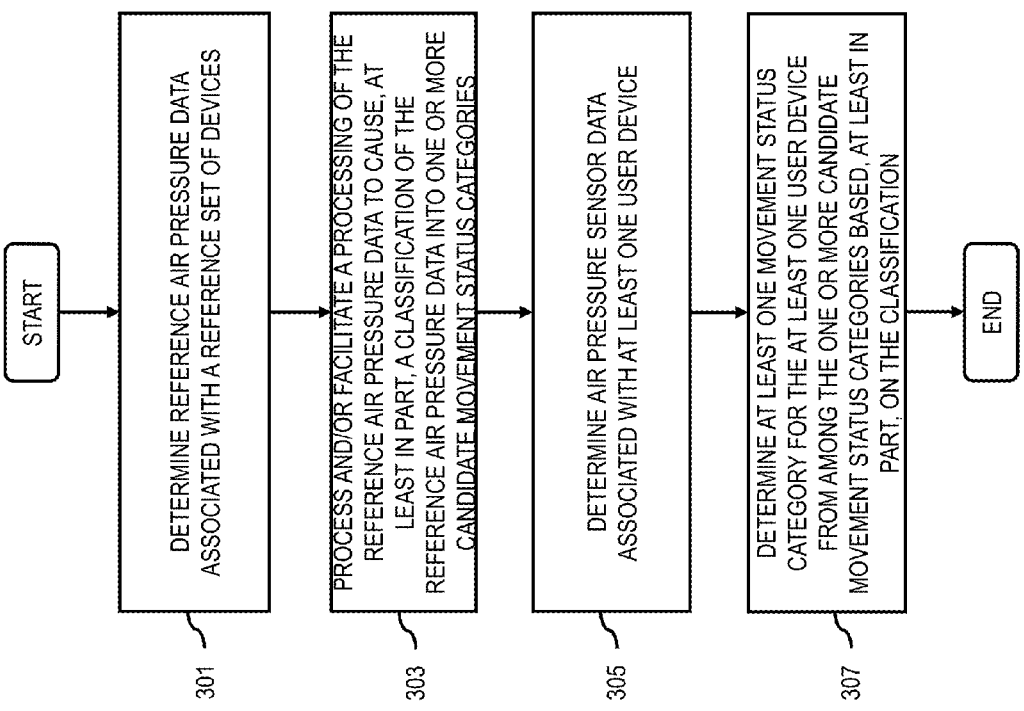
FIG. 3 is a flowchart of a process for determining movement status category for a user device based on candidate movement status categories, according to one embodiment.
Figure 16:
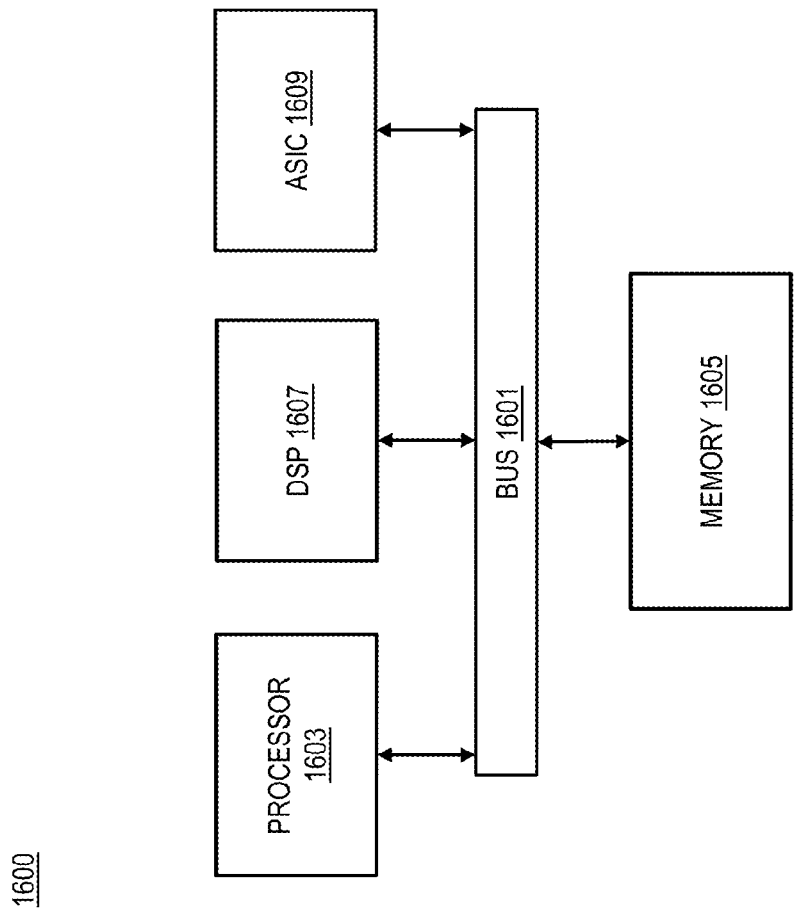
FIG. 16 is a diagram of a chip set that can be used to implement an embodiment of the invention.

FIG. 3 is a flowchart of a process for determining movement status category for a user device based on candidate movement status categories, according to one embodiment. In one embodiment, the coordination platform 109 performs the process 300 and is implemented in, for instance, a chip set including a processor and a memory as shown in FIG. 16.

In step 301, the coordination platform 109 may determine reference air pressure data associated with a reference set of devices. In one scenario, the coordination platform 109 may collect air pressure data from one or more barometer sensors associated with one or more reference set of devices to determine the mode of transportation for a user, user activities, location of the user, environmental condition surrounding a user device, travel paths etc.

In step 303, the coordination platform 109 may process and/or facilitate a processing of the reference air pressure data to cause, at least in part, a classification of the reference air pressure data into one or more candidate movement status categories. In one embodiment, the processing of the reference air pressure data, the air pressure data associated with the at least one device, or a combination thereof comprises at least one of:

a smoothing of the reference air pressure data, the air pressure data associated with the at least one device, or a combination thereof;

a mathematical differentiation of the reference air pressure data, the air pressure data associated with the at least one device, or a combination thereof; and an application of a threshold filter on the reference air pressure data, the air pressure data associated with the at least one device, or a combination thereof.

In step 305, the coordination platform 109 may determine air pressure sensor data associated with at least one user device. In one scenario, the coordination platform 109 may determine air pressure data for at least one moving vehicle, at least one user device, or a combination thereof. Then, the coordination platform 109 may determine the status for at least one moving vehicle, at least one user device, or a combination thereof based on the candidate movement status categories.

In step 307, the coordination platform 109 may determine at least one movement status category for the at least one user device from among the one or more candidate movement status categories based, at least in part, on the classification. In one scenario, the coordination platform 109 may detect the mode of transportation to be a bus based on candidate movement status categories, whereupon the at least one user device may be adapted to perform following functions:
  (a) Prompt users to switch user device to a silent mode;
  (b) Activation of reminders to users to get off based on the historic air pressure profile stored on the cloud backend;
  (c) Switch on the weather alert; and
  (d) Automatically record daily commute routines (e.g., start time, end time, duration).

In another scenario, the coordination platform 109 may determine that a user is in an elevator based on candidate movement status categories, whereupon the at least one user device may be paused from scanning for cellular signals to save battery. Further, the user device may be switched to a silent mode.

Figure 4:
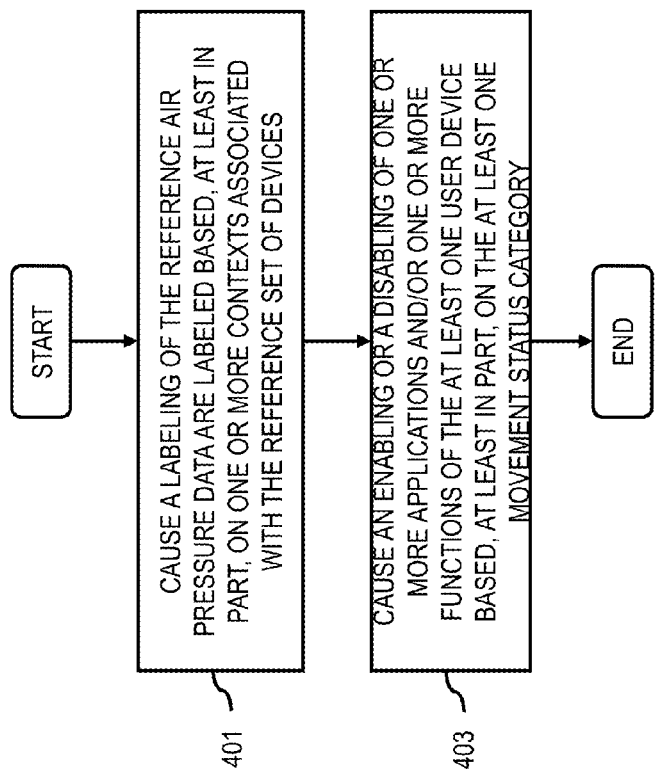
FIG. 4 is a flowchart of a process for labelling reference air pressure data, and enabling applications and/or functions based on movement status category, according to one embodiment.

FIG. 4 is a flowchart of a process for labelling reference air pressure data, and enabling applications and/or functions based on movement status category, according to one embodiment. In one embodiment, the coordination platform 109 performs the process 400 and is implemented in, for instance, a chip set including a processor and a memory as shown in FIG. 16.

In step 401, the coordination platform 109 may cause, at least in part, a labeling of the reference air pressure data are labeled based, at least in part, on one or more contexts associated with the reference set of devices. In one embodiment, the one or more candidate movement status categories, the one or more contexts, or a combination thereof are associated with one or more modes of transport, one or more paths of travel, one or more user activities, or a combination thereof. In one embodiment, the labeling is based, at least in part, on user input, sensor data, or a combination thereof. In one scenario, the coordination platform 109 may adapt at least one user device based on the detected mode of transportation. In one example embodiment, the coordination platform 109 via sensors 105 may detect that a user is riding a bike, the user device may be adapted to perform the following functions:
  (a) Auto reply to text messages;
  (b) Activation of loudspeakers when receiving calls;
  (c) Activation of weather alerts and sun exposure alerts; and
  (d) An automatic recording of daily biking routines (e.g., start time, end time, duration) to compile a weekly/monthly fitness report. The recorded report may be matched to the elevation profiles on the cloud backend, and may calculate and record the total distance biked.

In step 403, the coordination platform 109 may cause, at least in part, an enabling or a disabling of one or more applications, one or more functions, or a combination thereof of the at least one user device based, at least in part, on the at least one movement status category. In one scenario, the coordination platform 109 may adapt the behavior of at least one user device upon detecting that a user is driving a car. For example, the coordination platform 109 may
  (a) Switch the user device to either silent or hands free mode depending on whether it is legal to drive and talk on the user device;
  (b) Activate text reply of incoming calls if the user device is in silent mode;
  (c) Activate auto reply of text messages or allow voice input for texting depending on whether it is legal to drive and text;
  (d) Activate the severe weather alert;
  (e) Automated recording of the daily commute routines (e.g., start time, end time, duration). Then match the recorded reports to elevation profiles on the cloud backend, and then calculate and record total distance driven; and
  (f) Automatic recording of the location where car was last parked and provide a reminder service.

Figure 5:
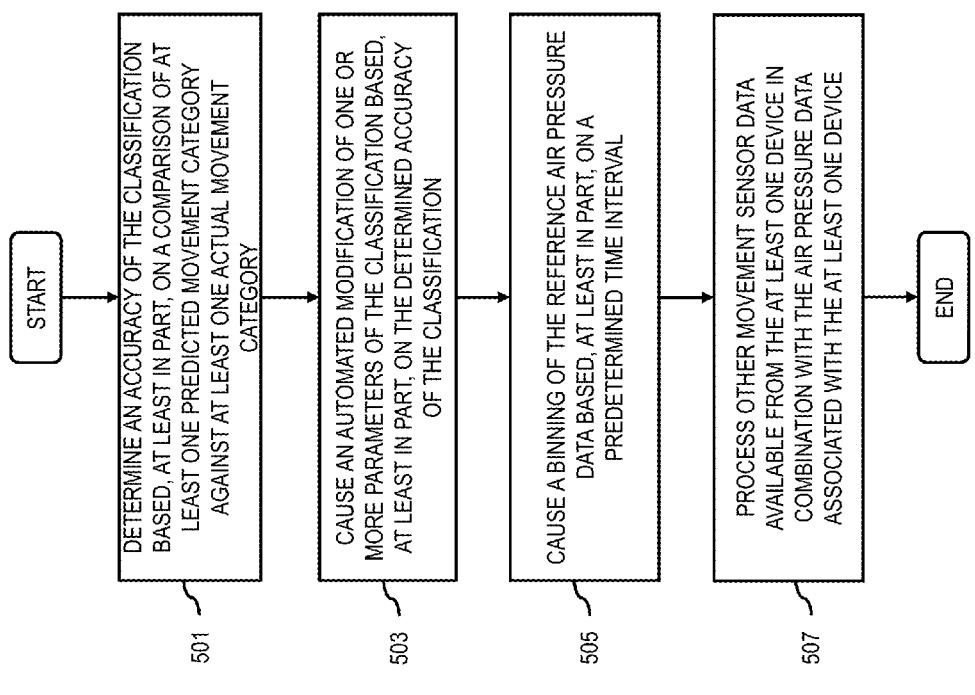
FIG. 5 is a flowchart of a process for determining accuracy of the classification, and processing other movement sensor data with the air pressure data associated with a device, according to one embodiment.

FIG. 5 is a flowchart of a process for determining accuracy of the classification, and processing other movement sensor data with the air pressure data associated with a device, according to one embodiment. In one embodiment, the coordination platform 109 performs the process 500 and is implemented in, for instance, a chip set including a processor and a memory as shown in FIG. 16.

In step 501, the coordination platform 109 may determine an accuracy of the classification based, at least in part, on a comparison of at least one predicted movement category against at least one actual movement category. In one embodiment, the at least one actual movement category is received as input from a user. In one scenario, the coordination platform 109 may collect air pressure data around at least one user based on user input, wherein user input include user context information. Then, the coordination platform 109 may measure the accuracy of the one or more results from a classification by comparing predicted movement category with the actual movement category.

In step 503, the coordination platform 109 may cause, at least in part, an automated modification of one or more parameters of the classification based, at least in part, on the determined accuracy of the classification. In one scenario, the coordination platform 109 may cause an extraction of one or more labelled air pressure data from the cloud storage to adjust one or more parameters based on the accuracy. Then, the coordination platform 109 may generate an optimized status for at least one user device.

In step 505, the coordination platform 109 may cause, at least in part, a binning of the reference air pressure data based, at least in part, on a predetermined time interval. In one embodiment, the accuracy of the classification is determined based, at least in part, on the binning. In one scenario, the coordination platform 109 may cause a binning of prediction on time threshold, e.g., each minute.

In step 507, the coordination platform 109 may process and/or facilitate a processing of other movement sensor data available from the at least one device in combination with the air pressure data associated with the at least one device to determine the at least one movement status category associated with the at least one device. In one scenario, various sensors 105 may work individually or together to collect the sensor data. In one scenario, accelerometer may detect movements of a user associated with a user device, for example, a user moving from sitting position to standing position while the barometer may record any changes in air pressure during the movement.

Figure 6:
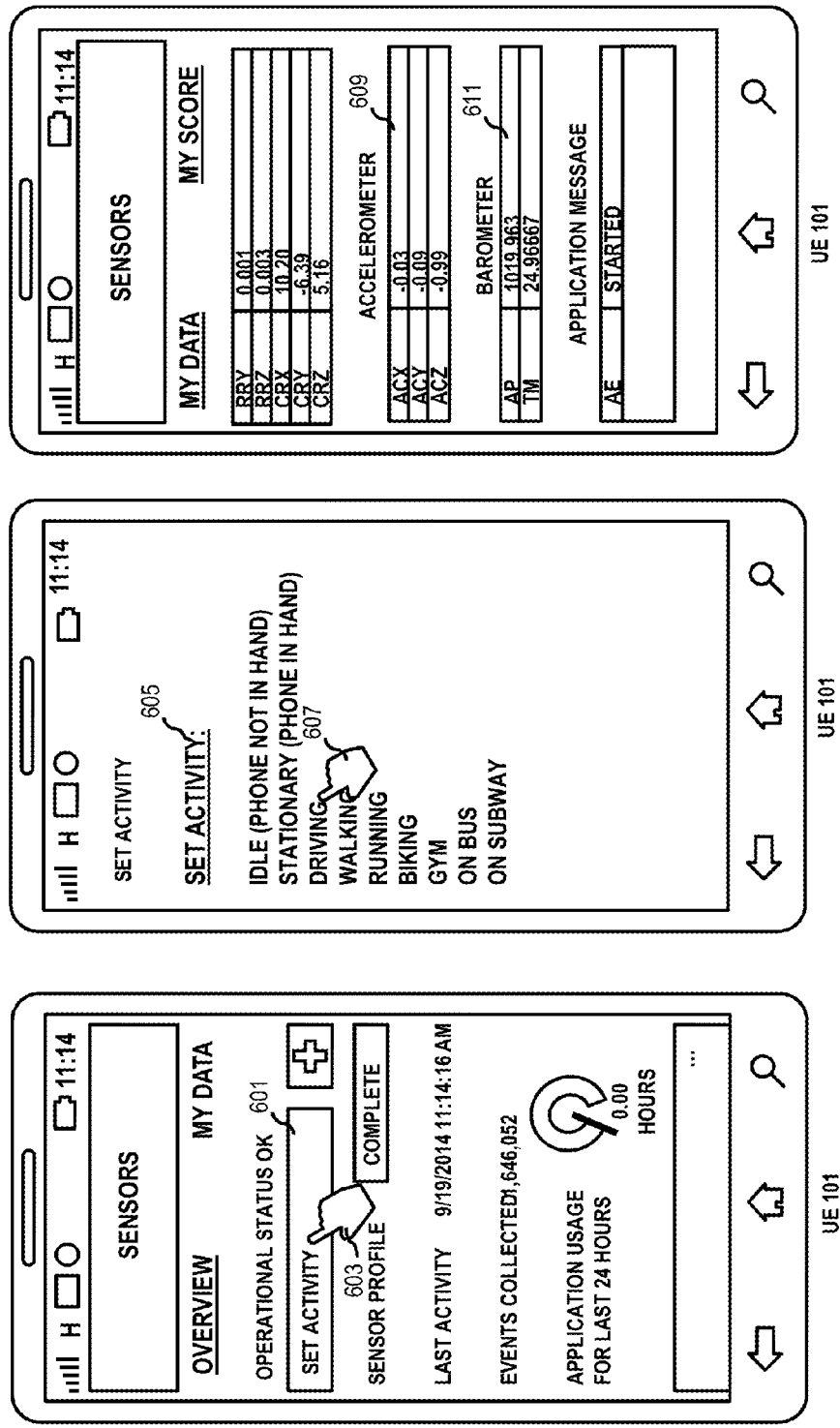
FIG. 6 is a user interface diagram that represents a scenario wherein at least one user enters his/her context information, whereupon the coordination platform 109 automatically collects barometric data around the user, according to one example embodiment.

FIG. 6 is a user interface diagram that represents a scenario wherein at least one user enters his/her context information, whereupon the coordination platform 109 automatically collects barometric data around the user, according to one example embodiment. In one scenario, a user activates the barometer in at least one UE 101 by setting the activity information [601] he/she wants to enter by clicking the 'set activity' tab [603]. Then, the user may be presented with a list of activity [605]. The user may input the activity of user context (e.g. driving, walking, stationary, idle, subway, etc.) by clicking at least one item on the list [607]. Subsequently, the selection of at least one activity from the list initiates the sensors to automatically collect the barometric data around the user. The, the selection of at least one item initiates sensors calculation. In one scenario, the coordination platform 109 may collect 'population' of labelled data from one or more users in a cloud storage. The coordination platform 109 may implement off-the-shelf random forest classifier/algorithm by pulling the labeled data from the cloud storage to adjust one or more parameters based on the input pairs of barometric data-context, and to generate the optimized moving status for at least one user. The user may be presented with the collected labelled data [609] and the barometric data [611 when the user is driving.

Figure 7:
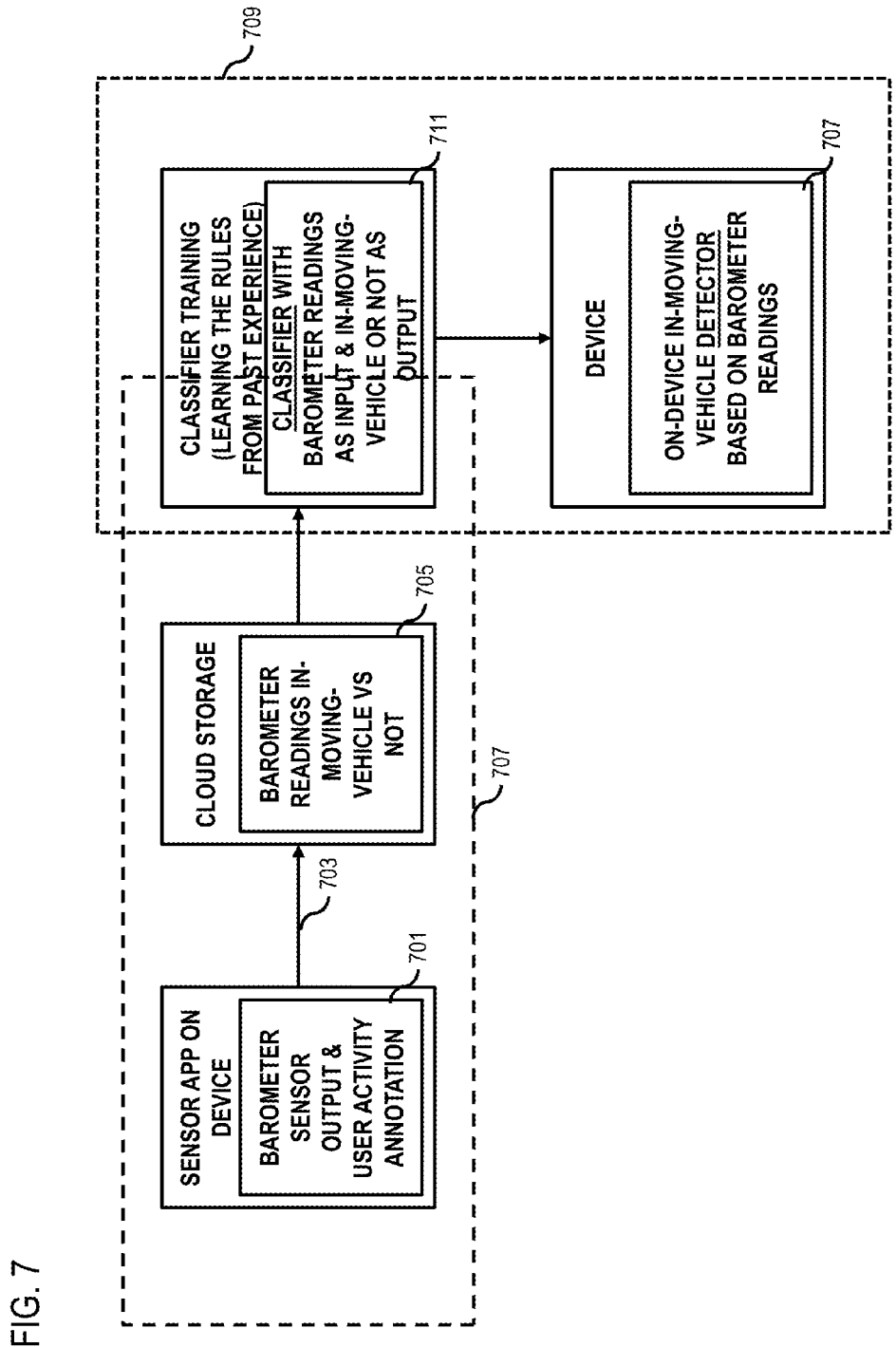
FIG. 7 is a flow chart that represents the process of collecting labeled data inputted to a cloud storage, and testing the accuracy of the labeled data, according to one example embodiment.

FIG. 7 is a flow chart that represents the process of collecting labeled data inputted to a cloud storage, and testing the accuracy of the labeled data, according to one example embodiment. In one scenario, a training phase [707] may be implemented wherein at least one sensor application (e.g. barometer) in a UE 101 may collect labeled data inputted [701], and may store the collected data in the cloud storage [703]. Then, the coordination platform 109 may test the accuracy of the labeled data as part of the results of the classifier (i.e., Random Forest classifier/algorithm) [703]. In another scenario, the 'usage phase' [709] may be implemented to generate the moving status of one or more user devices. It is anticipated that the labeled data improves the accuracy of the results from the classifier, and the category of the moving context (e.g. walking, subway, bus, etc.) a user is in. In one example embodiment, the coordination platform 109 may collect historical travel information for at least one user, and may determine duration for one or more future trips based on the historical travel information [711]. Eventually, the user may not need to input labeled data frequently (i.e. the accuracy and amount of the collected labelled data are sufficient). Instead, the application programming interface (API) may be provided to the user during the usage phase. In one example embodiment, when a user is detected driving a vehicle (based on the barometric data), and the information is fed into the system, the method or API may disable short message service (SMS) sending services, however the SMS receiving service may still remain active.

Figure 8:
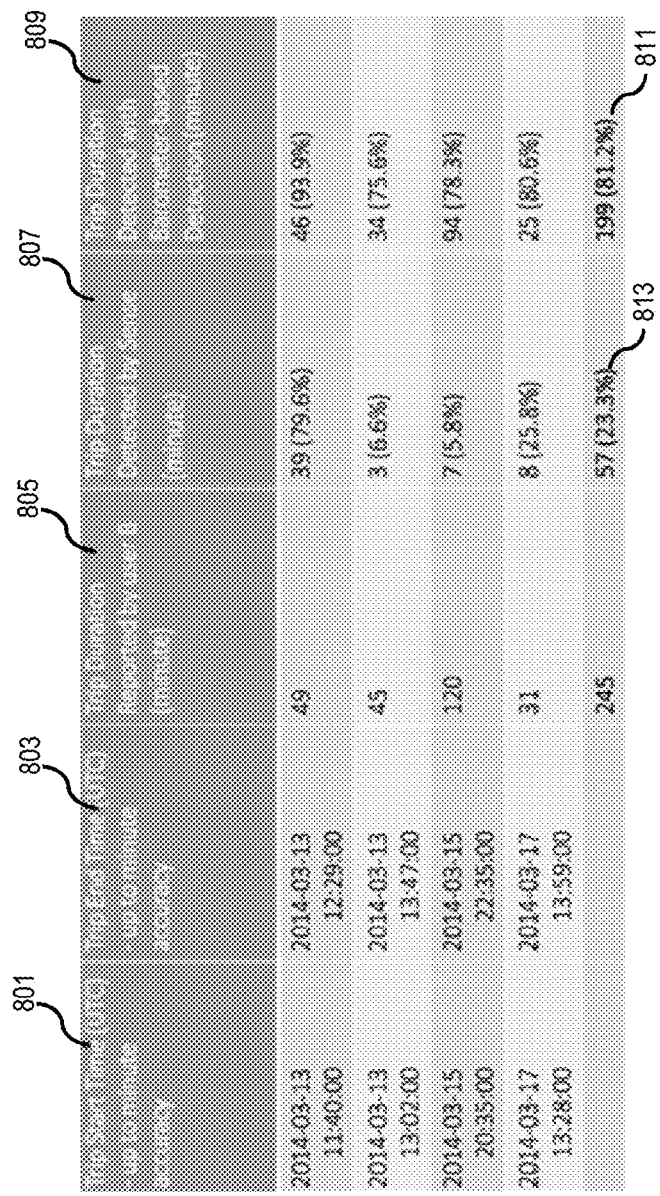
FIG. 8 is a table diagram that compares the accuracy level amongst various algorithms, according to one example embodiment.

FIG. 8 is a table diagram that compares the accuracy level amongst various algorithms, according to one example embodiment. In one scenario, the table diagram provides date and start time for a travel [801], end time for a travel [803], total trip duration [805], trip duration detected by the other sensors using accelerometer approach [807], and trip duration detected with the barometer based approach [809]. The barometric based approach provides higher accuracy in detecting the trip duration as compared to other sensor method. The barometric based approach is 81.2% accurate to the other sensor based approach that is only 23.3% accurate.

Figure 9:
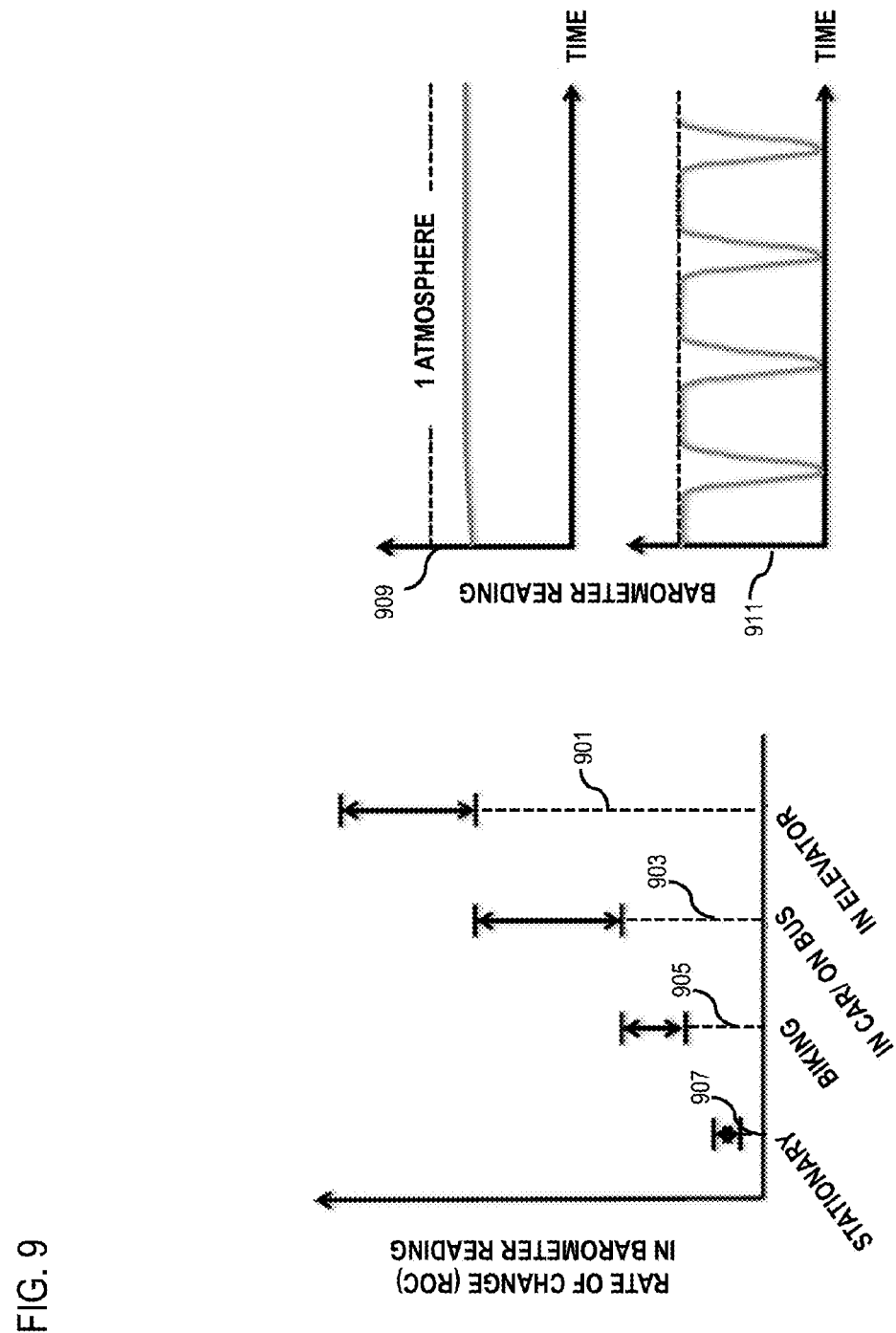
FIG. 9 is a graphical representation of air pressure profiles in different transportation modes, according to one example embodiment.

FIG. 9 is a graphical representation of air pressure profiles in different transportation modes, according to one example embodiment. In one scenario, the gravity dominates air pressure changes in a leaky environment. The rate of change in barometer reading is higher when the user is in an elevator [901] as compared to when the user is in a bus [903]. When a user is in a stationary position [907] the rate of change of the barometer reading is the lowest as compared to other activities performed by the user [901, 903, 905]. On the other hand, cabin pressurization dominates air pressure data, in an airplane or in a high-speed train (with regular gas exchange). The graph 909 represents barometer reading in an airplane where the air pressure data remains relatively constant for a specific period of time. Alternatively, graph 911 represents barometer reading in a high-speed train where the rate of change of air pressure data is erratic. In one scenario, the coordination platform 109 upon determining that the mode of transportation is an airplane may adapt a user device to perform following functions:
  (a) Switch to airplane mode;
  (b) Pause scanning for cellular signals to save power, if not already included in airplane mode;
  (c) Automatically record trip statistics (e.g., start time, end time, duration); and
  (d) Prompt to suggest an eBook or a downloadable movie to purchase ahead of time (if a routine is detected).

In another scenario, the coordination platform 109 may determine that a user is travelling in a high-speed train. Then, the coordination platform 109 may cause the user device to prompt users to switch their respective user devices to silent mode, and/or automatically record the trip statistics.

Figure 10:
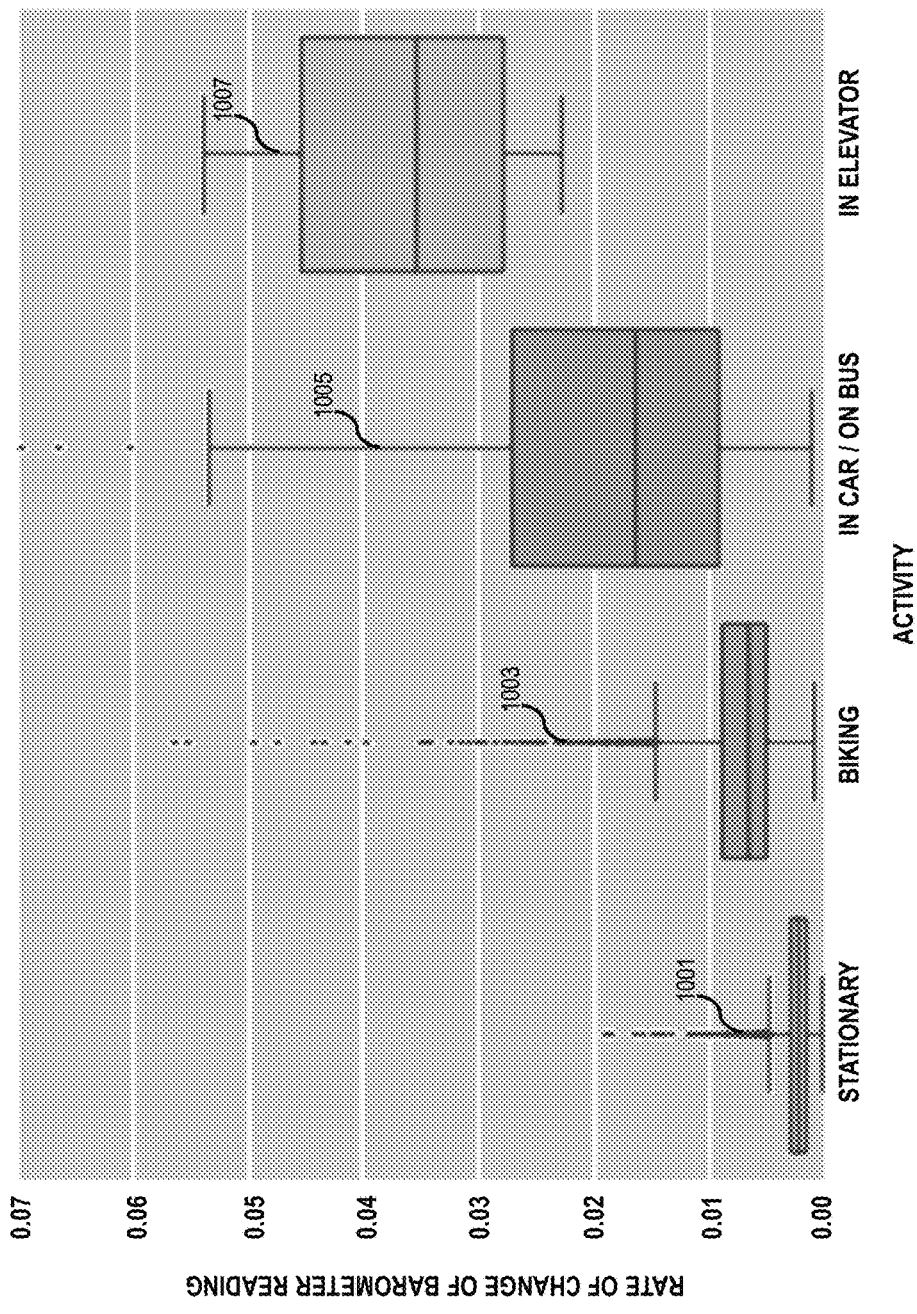
FIG. 10 is a block diagram that represents the change of barometer reading based on user activity, according to one example embodiment.

FIG. 10 is a block diagram that represents the change of barometer reading based on user activity, according to one example embodiment. In one scenario, the rate of change of barometer reading is the least when a user is stationary [1001]. However, when a user performs any activity (for example, biking [1003], driving [1005], accessing an elevator [1007] etc.) the rate of change of barometer reading increases. In one example embodiment, the air pressure data may vary with the height, hence when a user is travelling up and down the elevators of a tall building the rate of change of barometer reading is bound to increase [1007].

Figure 11:
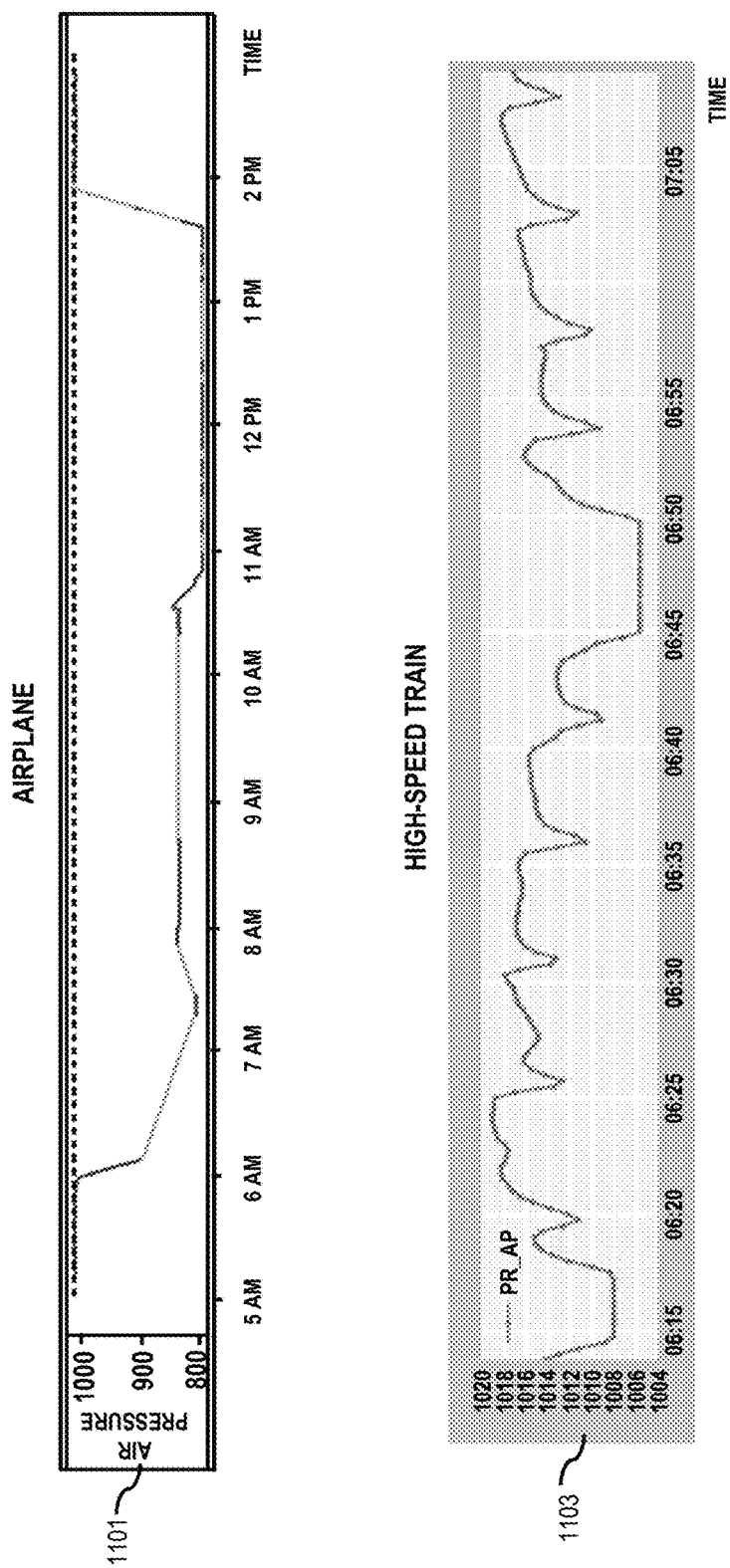
FIG. 11 is a graphical representation of a barometer reading of air pressure data between different modes of transportation, according to one example embodiment.

FIG. 11 is a graphical representation of a barometer reading of air pressure data between different modes of transportation, according to one example embodiment. FIG. 1101, shows the rate of change of barometer reading for air pressure data in an airplane, wherein the barometer reading changes between 800 through 1000. On the other hand, FIG. 1103, shows the rate of change of barometer reading for air pressure data in a high-speed train, wherein the barometer reading changes between 1004 through 1020.

FIGS. 12A and 12B illustrate a graphical representation of the functioning of an algorithm for determining the rate of change in air pressure data for at least one user device, according to one example embodiment. At step 1201, the coordination platform 109 performs the process of smoothing the speed data to enhance data analysis by reducing the noise. At step 1203, the coordination platform 109 labels the speed data based on the contexts associated with one or more user devices. The context of one or more devices is correlated to the data. At step 1205, the coordination platform 109 determines air pressure data for at least one user device. Then, the coordination platform 109 records the change of air pressure data [1207]. Subsequently, the coordination platform 109 enhances analysis of air pressure data by smoothing the air pressure data and reducing the noise [1209]. At step 1211, the coordination platform 109 determines whether the rate of change of air pressure data is above or below the threshold value. Then, in step 1213, the coordination platform 109 determines a median for the rate of change in the smoothed air pressure data. At step 1215, the coordination platform 109 determines whether the rate of change in smoothed air pressure data is above or below the threshold value.

Figure 13B:
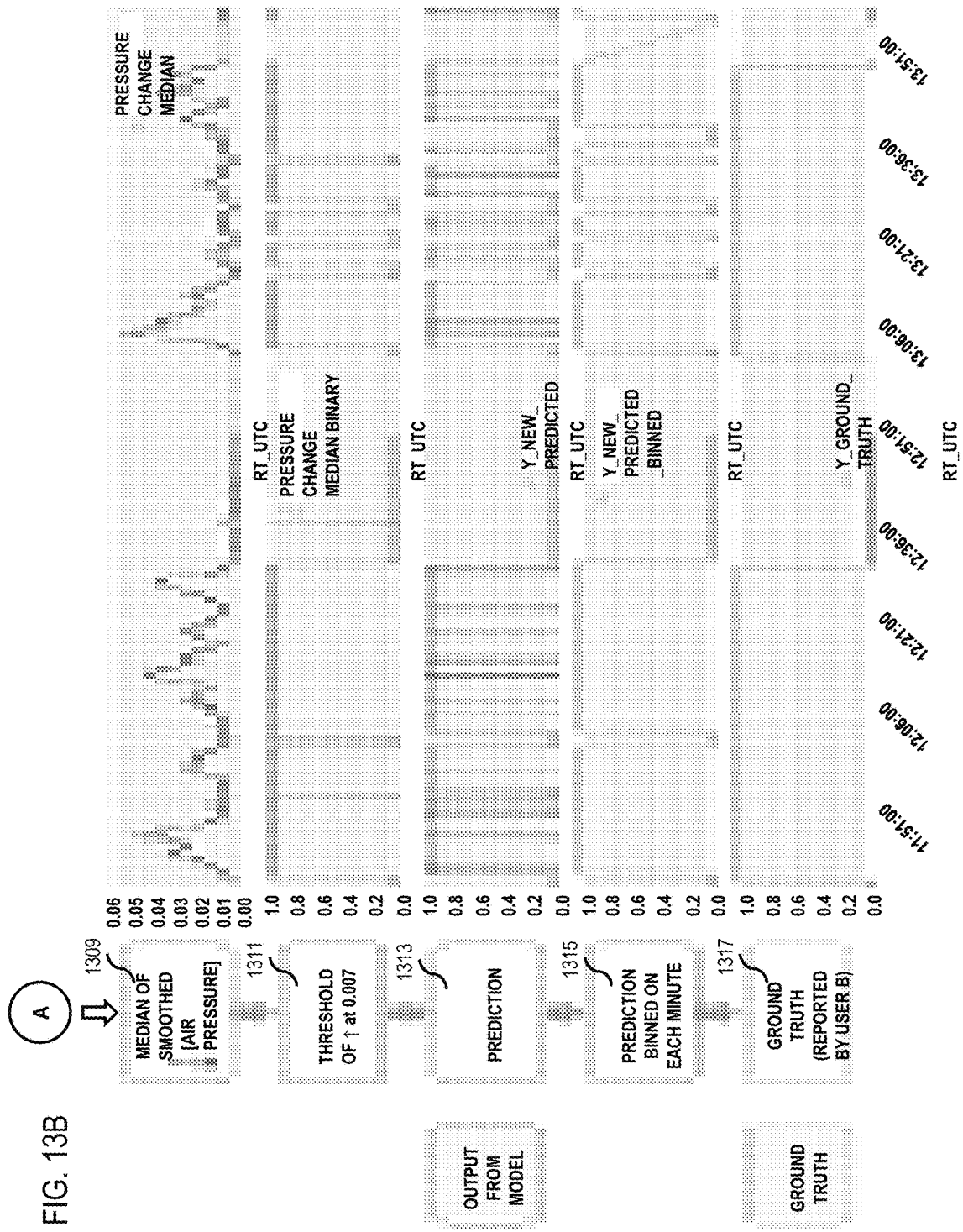

FIGS. 13A and 13B is a are graphical representations of the functioning of an algorithm for measuring the accuracy of air pressure data associated with user devices, according to one example embodiment. At step 1301, the coordination platform 109 generates input for a model by determining air pressure data for at least one user device. At step 1303, the coordination platform 109 records the change in air pressure data. Then, in step 1305, the coordination platform 109 enhances analysis of air pressure data by smoothing the air pressure data and reducing the noise. At step 1307, the coordination platform 109 determines whether the rate of change of air pressure data is above or below the threshold value. Then, in step 1309, the coordination platform 109 determines a median for the rate of change in the smoothed air pressure data. At step 1311, the coordination platform 109 determines whether the rate of change of air pressure data is above or below the median binary value. Then, at step 1313 the coordination platform 109 generates output from the model by predicting the air pressure data for at least one user device based on stored information. At, step 1315, the coordination platform 109 causes binning of the reference air pressure data based, at least in part, on a predetermined time interval (e.g. every minute). In step 1317, the coordination platform 109 receives ground truth reported by at least one user from his/her user device. The reported ground truth is duly incorporated in the algorithm.

Figure 14A:
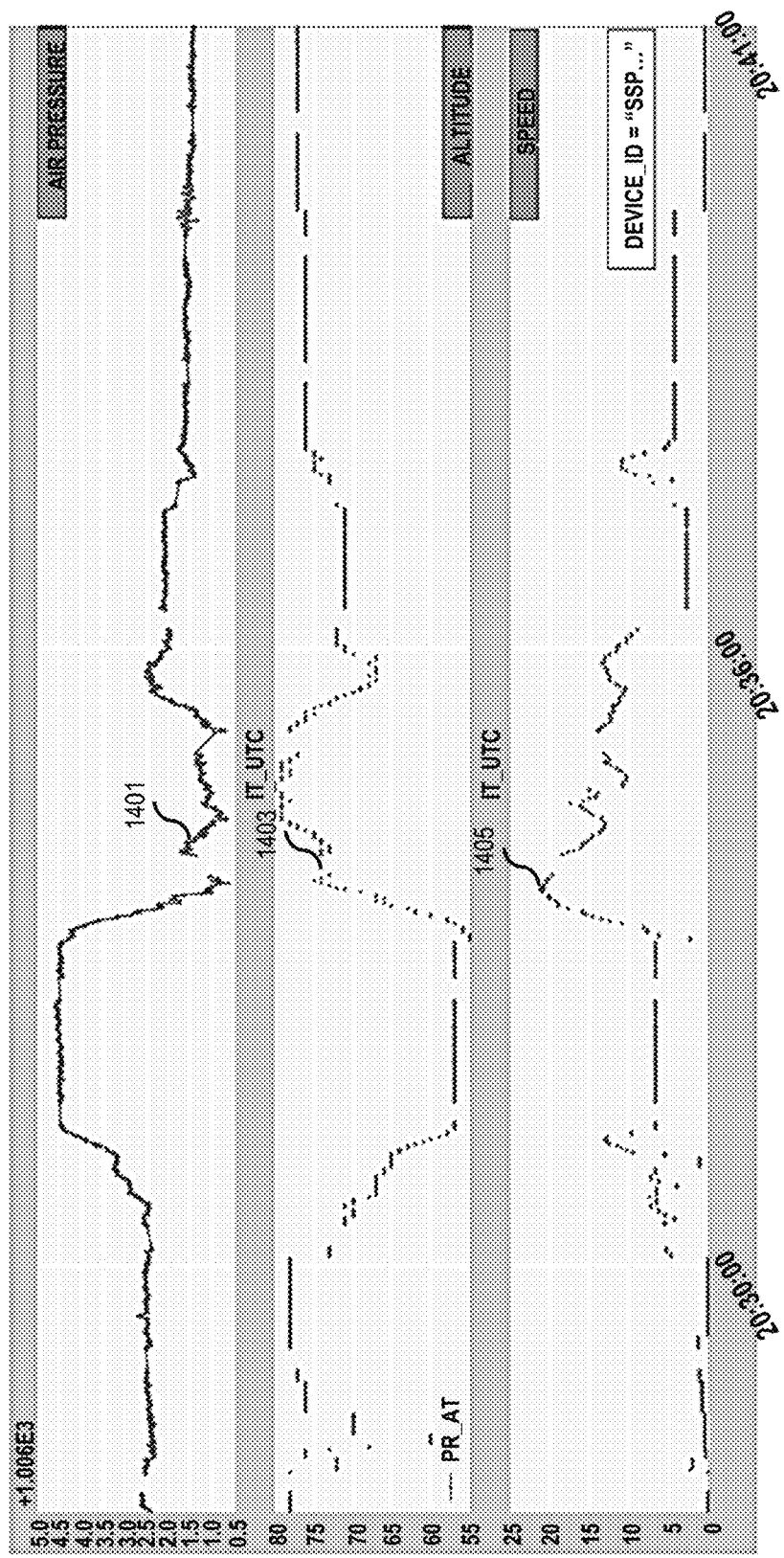
FIG. 14A is a graphical representation of the vertical speed from the rate of pressure change, according to one example embodiment.

FIG. 14A is a graphical representation of the vertical speed from the rate of pressure change, according to one example embodiment. In one scenario, the air pressure is low [1401] with an increase in the altitude [1403]. In another scenario, the air pressure decreases [1401] with an increase in the speed [1405].

Figure 14B:
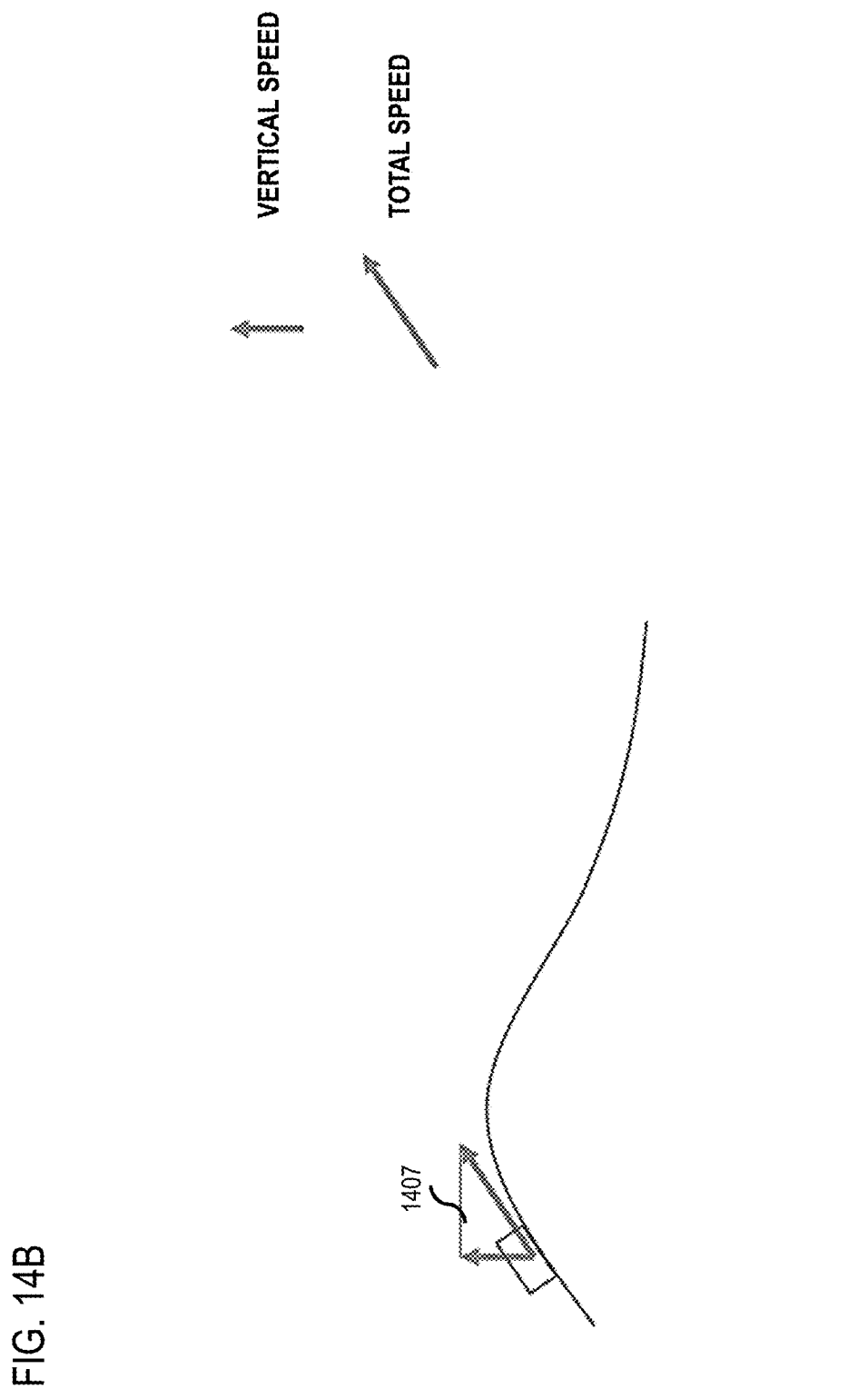
FIG. 14B is a graphical representation wherein total speed is estimated from the vertical speed, according to one example embodiment.

FIG. 14B is a graphical representation wherein total speed is estimated from the vertical speed, according to one example embodiment. In one scenario, the ratio between total speed and vertical speed can come from (a) historical or simulated data, or (b) accelerometer or motion API [1407].

FIG. 14C is a graph related to path recognition, according to one example embodiment. FIG. 14C represents a scenario wherein for trips taken on different days over the same route, there are differences but also striking similarities [1409]. The base levels of air pressure may differ from day to day, due to weather changes. However, the sequence of local maxima and local minima in air pressure traces may remain the same. Moreover, the magnitudes of these local extremes in air pressure match up from day to day. This is expected, as road conditions usually do not change significantly over the period of several days. It is the signature invariance in barometer readings that allows the users to use peak finding and template matching to automatically search for frequent paths and perform detection on the fly as new barometer readings stream in.

The processes described herein for determining movement information for at least one user device based, at least in part, on air pressure sensor data may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 15:
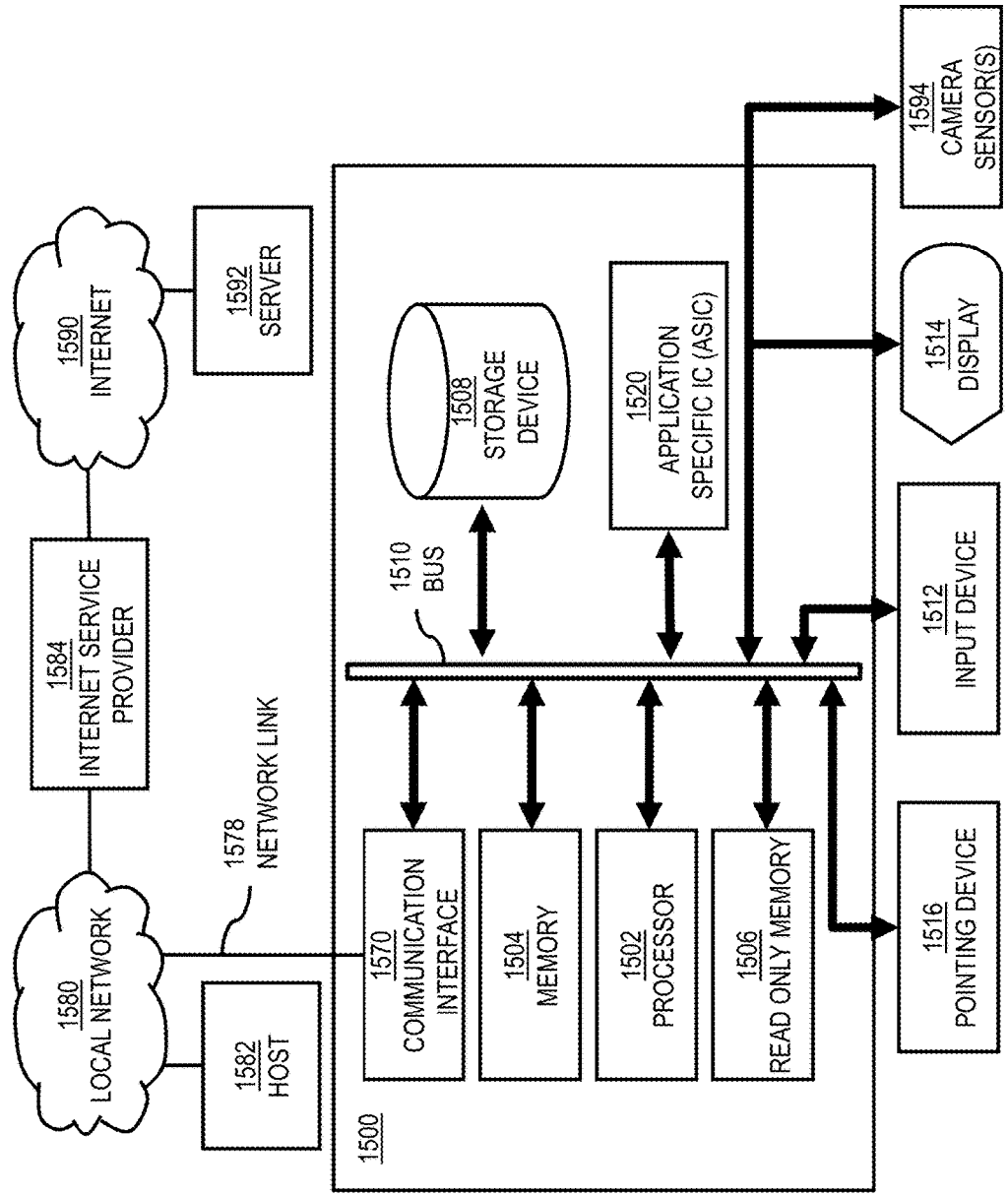
FIG. 15 is a diagram of hardware that can be used to implement an embodiment of the invention.

FIG. 15 illustrates a computer system 1500 upon which an embodiment of the invention may be implemented. Although computer system 1500 is depicted with respect to a particular device or equipment, it is contemplated that other devices or equipment (e.g., network elements, servers, etc.) within FIG. 15 can deploy the illustrated hardware and components of system 1500. Computer system 1500 is programmed (e.g., via computer program code or instructions) to determine movement information for at least one user device based, at least in part, on air pressure sensor data as described herein and includes a communication mechanism such as a bus 1510 for passing information between other internal and external components of the computer system 1500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1500, or a portion thereof, constitutes a means for performing one or more steps of determining movement information for at least one user device based, at least in part, on air pressure sensor data.

A bus 1510 includes one or more parallel conductors of information so that information is transferred quickly among devices coupled to the bus 1510. One or more processors 1502 for processing information are coupled with the bus 1510.

A processor (or multiple processors) 1502 performs a set of operations on information as specified by computer program code related to determine movement information for at least one user device based, at least in part, on air pressure sensor data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1510 and placing information on the bus 1510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1502, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1500 also includes a memory 1504 coupled to bus 1510. The memory 1504, such as a random access memory (RAM) or any other dynamic storage device, stores information including processor instructions for determining movement information for at least one user device based, at least in part, on air pressure sensor data. Dynamic memory allows information stored therein to be changed by the computer system 1500. RAM allows a unit of information stored at a location called a memory address to be stored and retrieved independently of information at neighboring addresses. The memory 1504 is also used by the processor 1502 to store temporary values during execution of processor instructions. The computer system 1500 also includes a read only memory (ROM) 1506 or any other static storage device coupled to the bus 1510 for storing static information, including instructions, that is not changed by the computer system 1500. Some memory is composed of volatile storage that loses the information stored thereon when power is lost. Also coupled to bus 1510 is a non-volatile (persistent) storage device 1508, such as a magnetic disk, optical disk or flash card, for storing information, including instructions, that persists even when the computer system 1500 is turned off or otherwise loses power.

Information, including instructions for determining movement information for at least one user device based, at least in part, on air pressure sensor data, is provided to the bus 1510 for use by the processor from an external input device 1512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1500. Other external devices coupled to bus 1510, used primarily for interacting with humans, include a display device 1514, such as a cathode ray tube (CRT), a liquid crystal display (LCD), a light emitting diode (LED) display, an organic LED (OLED) display, a plasma screen, or a printer for presenting text or images, and a pointing device 1516, such as a mouse, a trackball, cursor direction keys, or a motion sensor, for controlling a position of a small cursor image presented on the display 1514 and issuing commands associated with graphical elements presented on the display 1514, and one or more camera sensors 1594 for capturing, recording and causing to store one or more still and/or moving images (e.g., videos, movies, etc.) which also may comprise audio recordings. In some embodiments, for example, in embodiments in which the computer system 1500 performs all functions automatically without human input, one or more of external input device 1512, display device 1514 and pointing device 1516 may be omitted.

In the illustrated embodiment, special purpose hardware, such as an application specific integrated circuit (ASIC) 1520, is coupled to bus 1510. The special purpose hardware is configured to perform operations not performed by processor 1502 quickly enough for special purposes. Examples of ASICs include graphics accelerator cards for generating images for display 1514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1500 also includes one or more instances of a communications interface 1570 coupled to bus 1510. Communication interface 1570 provides a one-way or two-way communication coupling to a variety of external devices that operate with their own processors, such as printers, scanners and external disks. In general the coupling is with a network link 1578 that is connected to a local network 1580 to which a variety of external devices with their own processors are connected. For example, communication interface 1570 may be a parallel port or a serial port or a universal serial bus (USB) port on a personal computer. In some embodiments, communications interface 1570 is an integrated services digital network (ISDN) card or a digital subscriber line (DSL) card or a telephone modem that provides an information communication connection to a corresponding type of telephone line. In some embodiments, a communication interface 1570 is a cable modem that converts signals on bus 1510 into signals for a communication connection over a coaxial cable or into optical signals for a communication connection over a fiber optic cable. As another example, communications interface 1570 may be a local area network (LAN) card to provide a data communication connection to a compatible LAN, such as Ethernet. Wireless links may also be implemented. For wireless links, the communications interface 1570 sends or receives or both sends and receives electrical, acoustic or electromagnetic signals, including infrared and optical signals, that carry information streams, such as digital data. For example, in wireless handheld devices, such as mobile telephones like cell phones, the communications interface 1570 includes a radio band electromagnetic transmitter and receiver called a radio transceiver. In certain embodiments, the communications interface 1570 enables connection to the communication network 107 for determining movement information for at least one user device based, at least in part, on air pressure sensor data to the UE 101.

The term "computer-readable medium" as used herein refers to any medium that participates in providing information to processor 1502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1508. Volatile media include, for example, dynamic memory 1504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1520.

Network link 1578 typically provides information communication using transmission media through one or more networks to other devices that use or process the information. For example, network link 1578 may provide a connection through local network 1580 to a host computer 1582 or to equipment 1584 operated by an Internet Service Provider (ISP). ISP equipment 1584 in turn provides data communication services through the public, world-wide packet-switching communication network of networks now commonly referred to as the Internet 1590.

A computer called a server host 1592 connected to the Internet hosts a process that provides a service in response to information received over the Internet. For example, server host 1592 hosts a process that provides information representing video data for presentation at display 1514. It is contemplated that the components of system 1500 can be deployed in various configurations within other computer systems, e.g., host 1582 and server 1592.

At least some embodiments of the invention are related to the use of computer system 1500 for implementing some or all of the techniques described herein. According to one embodiment of the invention, those techniques are performed by computer system 1500 in response to processor 1502 executing one or more sequences of one or more processor instructions contained in memory 1504. Such instructions, also called computer instructions, software and program code, may be read into memory 1504 from another computer-readable medium such as storage device 1508 or network link 1578. Execution of the sequences of instructions contained in memory 1504 causes processor 1502 to perform one or more of the method steps described herein. In alternative embodiments, hardware, such as ASIC 1520, may be used in place of or in combination with software to implement the invention. Thus, embodiments of the invention are not limited to any specific combination of hardware and software, unless otherwise explicitly stated herein.

The signals transmitted over network link 1578 and other networks through communications interface 1570, carry information to and from computer system 1500. Computer system 1500 can send and receive information, including program code, through the networks 1580, 1590 among others, through network link 1578 and communications interface 1570. In an example using the Internet 1590, a server host 1592 transmits program code for a particular application, requested by a message sent from computer 1500, through Internet 1590, ISP equipment 1584, local network 1580 and communications interface 1570. The received code may be executed by processor 1502 as it is received, or may be stored in memory 1504 or in storage device 1508 or any other non-volatile storage for later execution, or both. In this manner, computer system 1500 may obtain application program code in the form of signals on a carrier wave.

Various forms of computer readable media may be involved in carrying one or more sequence of instructions or data or both to processor 1502 for execution. For example, instructions and data may initially be carried on a magnetic disk of a remote computer such as host 1582. The remote computer loads the instructions and data into its dynamic memory and sends the instructions and data over a telephone line using a modem. A modem local to the computer system 1500 receives the instructions and data on a telephone line and uses an infra-red transmitter to convert the instructions and data to a signal on an infra-red carrier wave serving as the network link 1578. An infrared detector serving as communications interface 1570 receives the instructions and data carried in the infrared signal and places information representing the instructions and data onto bus 1510. Bus 1510 carries the information to memory 1504 from which processor 1502 retrieves and executes the instructions using some of the data sent with the instructions. The instructions and data received in memory 1504 may optionally be stored on storage device 1508, either before or after execution by the processor 1502.

FIG. 16 illustrates a chip set or chip 1600 upon which an embodiment of the invention may be implemented. Chip set 1600 is programmed to determine movement information for at least one user device based, at least in part, on air pressure sensor data as described herein and includes, for instance, the processor and memory components described with respect to FIG. 15 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1600 can be implemented in a single chip. It is further contemplated that in certain embodiments the chip set or chip 1600 can be implemented as a single "system on a chip." It is further contemplated that in certain embodiments a separate ASIC would not be used, for example, and that all relevant functions as disclosed herein would be performed by a processor or processors. Chip set or chip 1600, or a portion thereof, constitutes a means for performing one or more steps of providing user interface navigation information associated with the availability of functions. Chip set or chip 1600, or a portion thereof, constitutes a means for performing one or more steps of determining movement information for at least one user device based, at least in part, on air pressure sensor data.

In one embodiment, the chip set or chip 1600 includes a communication mechanism such as a bus 1601 for passing information among the components of the chip set 1600. A processor 1603 has connectivity to the bus 1601 to execute instructions and process information stored in, for example, a memory 1605. The processor 1603 may include one or more processing cores with each core configured to perform independently. A multi-core processor enables multiprocessing within a single physical package. Examples of a multi-core processor include two, four, eight, or greater numbers of processing cores. Alternatively or in addition, the processor 1603 may include one or more microprocessors configured in tandem via the bus 1601 to enable independent execution of instructions, pipelining, and multithreading. The processor 1603 may also be accompanied with one or more specialized components to perform certain processing functions and tasks such as one or more digital signal processors (DSP) 1607, or one or more application-specific integrated circuits (ASIC) 1609. A DSP 1607 typically is configured to process real-world signals (e.g., sound) in real time independently of the processor 1603. Similarly, an ASIC 1609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1600 includes merely one or more processors and some software and/or firmware supporting and/or relating to and/or for the one or more processors.

The processor 1603 and accompanying components have connectivity to the memory 1605 via the bus 1601. The memory 1605 includes both dynamic memory (e.g., RAM, magnetic disk, writable optical disk, etc.) and static memory (e.g., ROM, CD-ROM, etc.) for storing executable instructions that when executed perform the inventive steps described herein to determine movement information for at least one user device based, at least in part, on air pressure sensor data. The memory 1605 also stores the data associated with or generated by the execution of the inventive steps.

Figure 17:
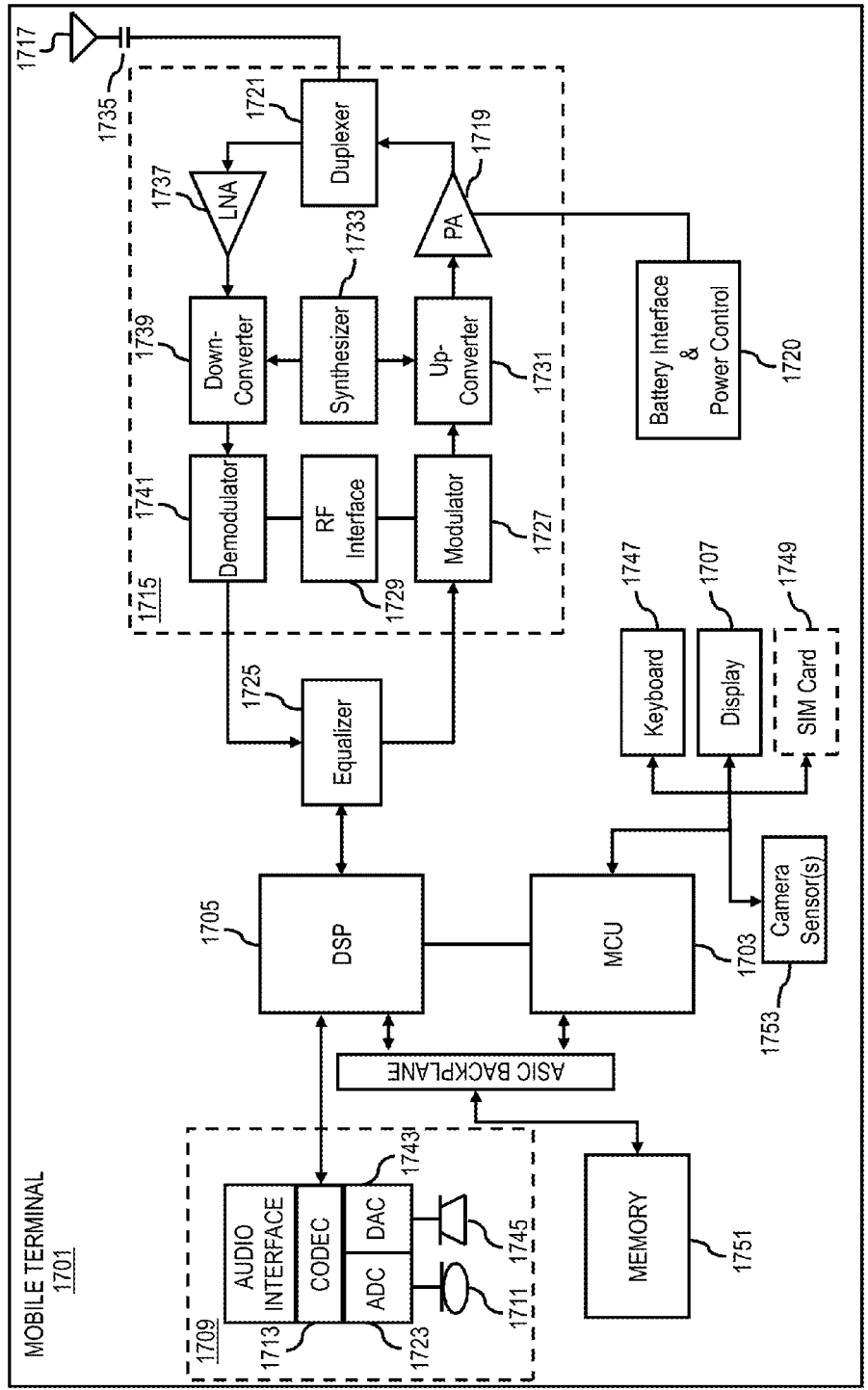
FIG. 17 is a diagram of a mobile terminal (e.g., handset) that can be used to implement an embodiment of the invention.

FIG. 17 is a diagram of exemplary components of a mobile terminal (e.g., handset) for communications, which is capable of operating in the system of FIG. 1, according to one embodiment. In some embodiments, mobile terminal 1701, or a portion thereof, constitutes a means for performing one or more steps of determining movement information for at least one user device based, at least in part, on air pressure sensor data. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1703, a Digital Signal Processor (DSP) 1705, and a receiver/transmitter unit including a microphone gain control unit and a speaker gain control unit. A main display unit 1707 provides a display to the user in support of various applications and mobile terminal functions that perform or support the steps of determining movement information for at least one user device based, at least in part, on air pressure sensor data. The display 1707 includes display circuitry configured to display at least a portion of a user interface of the mobile terminal (e.g., mobile telephone). Additionally, the display 1707 and display circuitry are configured to facilitate user control of at least some functions of the mobile terminal. An audio function circuitry 1709 includes a microphone 1711 and microphone amplifier that amplifies the speech signal output from the microphone 1711. The amplified speech signal output from the microphone 1711 is fed to a coder/decoder (CODEC) 1713.

A radio section 1715 amplifies power and converts frequency in order to communicate with a base station, which is included in a mobile communication system, via antenna 1717. The power amplifier (PA) 1719 and the transmitter/modulation circuitry are operationally responsive to the MCU 1703, with an output from the PA 1719 coupled to the duplexer 1721 or circulator or antenna switch, as known in the art. The PA 1719 also couples to a battery interface and power control unit 1720.

In use, a user of mobile terminal 1701 speaks into the microphone 1711 and his or her voice along with any detected background noise is converted into an analog voltage. The analog voltage is then converted into a digital signal through the Analog to Digital Converter (ADC) 1723. The control unit 1703 routes the digital signal into the DSP 1705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1725 for compensation of any frequency-dependent impairments that occur during transmission though the air such as phase and amplitude distortion. After equalizing the bit stream, the modulator 1727 combines the signal with a RF signal generated in the RF interface 1729. The modulator 1727 generates a sine wave by way of frequency or phase modulation. In order to prepare the signal for transmission, an up-converter 1731 combines the sine wave output from the modulator 1727 with another sine wave generated by a synthesizer 1733 to achieve the desired frequency of transmission. The signal is then sent through a PA 1719 to increase the signal to an appropriate power level. In practical systems, the PA 1719 acts as a variable gain amplifier whose gain is controlled by the DSP 1705 from information received from a network base station. The signal is then filtered within the duplexer 1721 and optionally sent to an antenna coupler 1735 to match impedances to provide maximum power transfer. Finally, the signal is transmitted via antenna 1717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1701 are received via antenna 1717 and immediately amplified by a low noise amplifier (LNA) 1737. A down-converter 1739 lowers the carrier frequency while the demodulator 1741 strips away the RF leaving only a digital bit stream. The signal then goes through the equalizer 1725 and is processed by the DSP 1705. A Digital to Analog Converter (DAC) 1743 converts the signal and the resulting output is transmitted to the user through the speaker 1745, all under control of a Main Control Unit (MCU) 1703 which can be implemented as a Central Processing Unit (CPU).

The MCU 1703 receives various signals including input signals from the keyboard 1747. The keyboard 1747 and/or the MCU 1703 in combination with other user input components (e.g., the microphone 1711) comprise a user interface circuitry for managing user input. The MCU 1703 runs a user interface software to facilitate user control of at least some functions of the mobile terminal 1701 to determine movement information for at least one user device based, at least in part, on air pressure sensor data. The MCU 1703 also delivers a display command and a switch command to the display 1707 and to the speech output switching controller, respectively. Further, the MCU 1703 exchanges information with the DSP 1705 and can access an optionally incorporated SIM card 1749 and a memory 1751. In addition, the MCU 1703 executes various control functions required of the terminal. The DSP 1705 may, depending upon the implementation, perform any of a variety of conventional digital processing functions on the voice signals. Additionally, DSP 1705 determines the background noise level of the local environment from the signals detected by microphone 1711 and sets the gain of microphone 1711 to a level selected to compensate for the natural tendency of the user of the mobile terminal 1701.

The CODEC 1713 includes the ADC 1723 and DAC 1743. The memory 1751 stores various data including call incoming tone data and is capable of storing other data including music data received via, e.g., the global Internet. The software module could reside in RAM memory, flash memory, registers, or any other form of writable storage medium known in the art. The memory device 1751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1749 carries, for instance, important information, such as the cellular phone number, the carrier supplying service, subscription details, and security information. The SIM card 1749 serves primarily to identify the mobile terminal 1701 on a radio network. The card 1749 also contains a memory for storing a personal telephone number registry, text messages, and user specific mobile terminal settings.

Further, one or more camera sensors 1753 may be incorporated onto the mobile station 1701 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    receiving reference air pressure data from a reference set of devices;
    processing the reference air pressure data to cause, at least in part, a classification of the reference air pressure data into one or more candidate movement status categories;
    determining air pressure sensor data associated with at least one user device;
    determining at least one movement status category for the at least one user device from among the one or more candidate movement status categories based, at least in part, on the classification of the reference air pressure data from the reference set of devices and the determined air pressure sensor data associated with the at least one user device; and
    enabling or disabling one or more functions of the user device based on the determined movement status category.

2. A method of claim 1, further comprising:
    labeling of the reference air pressure data based, at least in part, on one or more contexts associated with the reference set of devices.

3. A method of claim 2, wherein the one or more candidate movement status categories, the one or more contexts, or a combination thereof are associated with one or more modes of transport, one or more paths of travel, one or more user activities, or a combination thereof.

4. A method of claim 2, wherein the labeling is based, at least in part, on user input, sensor data, or a combination thereof.

5. A method of claim 1, further comprising:
    enabling or disabling of one or more applications, one or more functions, or a combination thereof of the at least one user device based, at least in part, on the at least one movement status category.

6. A method of claim 1, wherein the processing of the reference air pressure data, the air pressure data associated with the at least one device, or a combination thereof comprises at least one of:
    a smoothing of the reference air pressure data, the air pressure data associated with the at least one device, or a combination thereof;
    a mathematical differentiating of the reference air pressure data, the air pressure data associated with the at least one device, or a combination thereof; and
    applying a threshold filter on the reference air pressure data, the air pressure data associated with the at least one device, or a combination thereof.

7. A method of claim 1, further comprising:
    determining an accuracy of the classification based, at least in part, on a comparison of at least one predicted movement category against at least one actual movement category,
    wherein the at least one actual movement category is received as input from a user.

8. A method of claim 7, further comprising:
    automated modifying of one or more parameters of the classification based, at least in part, on the determined accuracy of the classification.

9. A method of claim 7, further comprising:
    binning the reference air pressure data based, at least in part, on a predetermined time interval,
    wherein the accuracy of the classification is determined based, at least in part, on the binning.

10. A method of claim 1, further comprising:
    processing other movement sensor data available from the at least one device in combination with the air pressure data associated with the at least one device to determine the at least one movement status category associated with the at least one device.

11. An apparatus comprising:
    at least one processor; and at least one memory including computer program code for one or more programs, the at least one memory and the computer program code configured to, with the at least one processor, cause the apparatus to perform at least the following, receiving reference air pressure data from a reference set of devices;

processing the reference air pressure data to cause, at least in part, a classification of the reference air pressure data into one or more candidate movement status categories;

determining air pressure sensor data associated with at least one user device;

determining at least one movement status category for the at least one user device from among the one or more candidate movement status categories based, at least in part, on the classification of the reference air pressure data from the reference set of devices and the determined air pressure sensor data associated with the at least one user device; and enabling or disabling one or more functions of the user device based on the determined movement status category.

12. An apparatus of claim 11, wherein the apparatus is further caused to:

label the reference air pressure data based, at least in part, on one or more contexts associated with the reference set of devices.

13. An apparatus of claim 12, wherein the one or more candidate movement status categories, the one or more contexts, or a combination thereof are associated with one or more modes of transport, one or more paths of travel, one or more user activities, or a combination thereof.

14. An apparatus of claim 12, wherein the labeling is based, at least in part, on user input, sensor data, or a combination thereof.

15. An apparatus of claim 11, wherein the apparatus is further caused to:

enable or disable one or more applications, one or more functions, or a combination thereof of the at least one user device based, at least in part, on the at least one movement status category.

16. An apparatus of claim 11, wherein the processing of the reference air pressure data, the air pressure data associated with the at least one device, or a combination thereof comprises at least one of:

a smoothing of the reference air pressure data, the air pressure data associated with the at least one device, or a combination thereof;

a mathematical differentiating of the reference air pressure data, the air pressure data associated with the at least one device, or a combination thereof; and applying a threshold filter on the reference air pressure data, the air pressure data associated with the at least one device, or a combination thereof.

17. An apparatus of claim 11, wherein the apparatus is further caused to:

determine an accuracy of the classification based, at least in part, on a comparison of at least one predicted movement category against at least one actual movement category, wherein the at least one actual movement category is received as input from a user.

18. A computer-readable storage medium carrying one or more sequences of one or more instructions which, when executed by one or more processors, cause an apparatus to at least perform the following steps:

receiving reference air pressure data from a reference set of devices;

processing the reference air pressure data to cause, at least in part, a classification of the reference air pressure data into one or more candidate movement status categories;

determining air pressure sensor data associated with at least one user device;

determining at least one movement status category for the at least one user device from among the one or more candidate movement status categories based, at least in part, on the classification of the reference air pressure data from the reference set of devices and the determined air pressure sensor data associated with the at least one user device; and enabling or disabling one or more functions of the user device based on the determined movement status category.

19. A computer-readable storage medium of claim 18, wherein the apparatus is further caused to:

label the reference air pressure data based, at least in part, on one or more contexts associated with the reference set of devices.

20. A computer-readable storage medium of claim 19, wherein the one or more candidate movement status categories, the one or more contexts, or a combination thereof are associated with one or more modes of transport, one or more paths of travel, one or more user activities, or a combination thereof.

* * * * *